United States Patent
Terada et al.

(10) Patent No.: US 9,760,616 B2
(45) Date of Patent: Sep. 12, 2017

(54) ELECTRONIC MAIL CREATION RECORDING MEDIUM, METHOD, AND INFORMATION PROCESSING APPARATUS

(71) Applicant: FUJITSU LIMITED, Kawasaki-shi, Kanagawa (JP)

(72) Inventors: Takeaki Terada, Kawasaki (JP); Satoru Torii, Yokohama (JP); Masanobu Morinaga, Yokohama (JP); Ikuya Morikawa, Nakahara (JP); Kouichi Itoh, Kawasaki (JP); Hiroshi Tsuda, Fujisawa (JP)

(73) Assignee: FUJITSU LIMITED, Kawasaki (JP)

( * ) Notice: Subject to any disclaimer, the term of this patent is extended or adjusted under 35 U.S.C. 154(b) by 369 days.

(21) Appl. No.: 14/478,003

(22) Filed: Sep. 5, 2014

(65) Prior Publication Data
US 2015/0081722 A1 Mar. 19, 2015

(30) Foreign Application Priority Data
Sep. 18, 2013 (JP) .................................. 2013-192942

(51) Int. Cl.
G06F 17/30 (2006.01)
G06Q 10/10 (2012.01)

(52) U.S. Cl.
CPC .. G06F 17/30569 (2013.01); G06F 17/30595 (2013.01); G06Q 10/107 (2013.01)

(58) Field of Classification Search
CPC ........ G06F 17/30569; G06F 17/30595; G06Q 10/107
See application file for complete search history.

(56) References Cited

U.S. PATENT DOCUMENTS

| | | | | |
|---|---|---|---|---|
| 7,620,894 | B1* | 11/2009 | Kahn | G06F 3/0481 715/707 |
| 2012/0124671 | A1* | 5/2012 | Fritzson | G06F 21/577 726/26 |
| 2013/0198846 | A1* | 8/2013 | Chapman | G06Q 10/0635 726/25 |
| 2015/0058426 | A1* | 2/2015 | Caskey | H04L 51/22 709/206 |

FOREIGN PATENT DOCUMENTS

| | | |
|---|---|---|
| JP | 10-240639 | 9/1998 |
| JP | 2004-038033 | 2/2004 |
| JP | 2007-164389 A | 6/2007 |
| JP | 2007-202046 | 8/2007 |

OTHER PUBLICATIONS

Japanese Office Action dated Apr. 18, 2017 for corresponding Japanese Patent Application No. 2013-192942, with English Translation, 5 pages.

* cited by examiner

*Primary Examiner* — Alexander Khong
(74) *Attorney, Agent, or Firm* — Fujitsu Patent Center

(57) ABSTRACT

A computer is disclosed that performs an electronic mail creation process. The computer creates an electronic mail by referring to a storage part in which received electronic mails are stored, using at least one electronic mail of the received electronic mails stored in the storage part, the at least one electronic mail selected based on a criteria being set beforehand, and changing at least one of header information and a body text of the at least one electronic mail.

5 Claims, 27 Drawing Sheets

FIG.3

23 E-MAIL DATA COMPONENTS

| Message-ID | SENDER E-MAIL ADDRESS | TITLE | BODY TEXT | ATTACHMENT FILE | URL | ATTACHMENT OPEN FLAG | URL ACCESS FLAG | REPLY FLAG | INQUIRY FLAG |
|---|---|---|---|---|---|---|---|---|---|
| idk1@ serverk1 | namek1@ domaink1 | [BUSINESS ML] SHIPPING OF ... | ... | shipping state of ....doc | http://serverk1.domaink1 | 1 | 0 | 1 | 1 |
| idk2@ serverk2 | namek2@ domaink2 | [A DIV. ML] BUDGET OF ... | ... | expense budget ....xls | | 1 | | 0 | 0 |
| idk3@ serverk3 | namek3@ domaink3 | BY B CORP. DEVELOPMENT TOOL, ... | ... | | http://serverk3.domaik3. | | 1 | 1 | 0 |
| ... | ... | ... | ... | ... | ... | ... | ... | ... | ... |

FIG.4

24 SENDER RANKING DATA

| SENDER E-MAIL ADDRESS | RECEIVED E-MAIL COUNT | REPLY RATIO (%) | ACCESS RATIO (%) | RANK |
|---|---|---|---|---|
| name1@abc.de | 100 | 80 | 80 | 1 |
| name2@fgh.ij | 90 | 70 | 60 | 2 |
| name3@jkl.mn | 8 | 60 | 70 | 2 |
| name4@opq.rs | 70 | 50 | 50 | 3 |
| ... | ... | ... | ... | ... |

FIG.5

32 TEST E-MAIL CREATION CRITERIA

| PROFIC-IENCY LEVEL | RANK OF SENDER B | SENDER E-MAIL ADDRESS | TITLE | ATTACHMENT FILE NAME OR URL LETTER STRING IN BODY TEXT | BODY TEXT | DESTINATION | DISTRIBUTION PERIOD |
|---|---|---|---|---|---|---|---|
| 1-3 | BOTTOM 33% | REPLACE + ADD RANDOM LETTER | REPLACE + DISPLACE WITH LITERAL ERROR | CHANGE WITH RANDOM LETTER STRING | REPLACE + LITERAL ERROR | NO OWN ADDRESS IN BOTH DESTINATION AND CC SECTION | 3 TIMES PER MONTH |
| 4-6 | BOTTOM 33% | REPLACE + ADD RANDOM LETTER | REPLACE + WORD URGING TO OPEN | REPLACE + LITERAL ERROR | REPLACE | NO OWN ADDRESS IN BOTH DESTINATION AND CC SECTION | TWICE PER MONTH |
| 7-9 | 34-66% | REPLACE | REPLACE + WORD ASSUMING THAT E-MAIL WAS PREVIOUSLY TRANSMITTED | REPLACE + LITERAL ERROR | REPLACE | REPLACE | TWICE PER MONTH |
| 10-12 | TOP 33% | REPLACE | REPLACE + ADD "RE:" OR "FW:" | REPLACE | REPLACE + LITERAL ERROR | REPLACE | ONCE PER MONTH |
| 13-15 | TOP 33% | NOT REPLACE | REPLACE | REPLACE | NOT REPLACE | REPLACE | ONCE PER MONTH |

FIG.6

33 TEST E-MAIL DATA

| Message-ID OF TEST E-MAIL | DISTRIBUTION DATE AND TIME | ACCESS COMPLETION FLAG | ACCESS CONTENT | NEWLY ARRIVED E-MAIL USAGE | Message-ID OF NEW ARRIVAL MAIL |
|---|---|---|---|---|---|
| id20@test | 2013/2/20 15:21 | 0 | NOT ACCESSED | 1 | ida2@serverb2.domainc2 |
| id19@test | 2013/1/18 16:40 | 1 | ATTACHMENT | 0 | |
| id18@test | 2012/12/23 10:10 | 1 | INQUIRY | 1 | ida1@serverb1.domainc1 |
| id17@test | 2012/11/21 9:34 | 1 | REPLY | 0 | |
| id16@test | 2012/11/19 9:34 | 0 | URL | 0 | |
| ... | ... | ... | ... | ... | ... |

FIG.7

62 PROFICIENCY LEVEL CHANGE RULE

| ACCESSED E-MAIL | ACCESS DETAILS | CHANGE VALUE OF PROFICIENCY LEVEL |
|---|---|---|
| TEST E-MAIL | OPENED ATTACHMENT, ACCESSED URL | -1 |
| TEST E-MAIL | REPLIED | -0.5 |
| TEST E-MAIL | PRESSED INQUIRY BUTTON | +1 |
| TEST E-MAIL | OPERATION OTHER THAN THOSE ABOVE | 0 |
| NOT TEST E-MAIL | PRESSED INQUIRY BUTTON | -0.25 |
| NOT TEST E-MAIL | OPERATION OTHER THAN PRESSING INQUIRY BUTTON (PRESSED DELETION BUTTON, PRESSED NEW CREATION BUTTON, NOT ACCESSED, OR THE LIKE) | 0 |

FIG.8

63 PROFICIENCY LEVEL DATA

| PROFICIENCY LEVEL | UPDATED DATE AND TIME | Message-ID OF TEST E-MAIL |
|---|---|---|
| 6 | 2013/1/18 16:55 | a1bc2dfe33@test |
| 7 | 2012/12/23 10:20 | a1bc2dfe32@test |
| 6 | 2012/11/21 10:22 | a1bc2dfe31@test |
| ... | ... | ... |

FIG.19

- SENDER: Manager Suzuki < k-suzuki@abc.com >
- DESTINATION: Shigeyoshi Igawa < s-igawa@abc.com >
- TITLE: [sclab 2141] top-10 report for security
- ATTACHMENT FILE NAME: top-10-report.docx
- BODY TEXT:

Mr. Igawa:

This is Suzuki.
I have received, from Mr. Tanaka, a draft report of a work group which Mr. Tanaka acts in.
He summarizes 10 important points regarding security in the draft report.

———
Kantaro Suzuki
Security Laboratory
E-mail: k-suzuki@abc.com

FIG.20

- SENDER: Taro Morita < t-morita@abc.com >
- DESTINATION: Safety and Health Committee ML < anzen-group@abc.com >
- TITLE: (Notice) Opening of Safety and Health Committee
- ATTACHMENT FILE NAME:   agenda.docx
- BODY TEXT:

February 22, 2013

Safety and Health Committee

Safety and Health Committee Members:

(Notice) Opening of Safety and Health Committee

The Safety and Health Committee will be held as follows on March, 2013.
You are kindly invited to attend the Committee.
Please reply to us whether you will or not attend by using the URL below.

http://server1.abcde.com/attendance.asp
=====
General Affairs Department
Safety and Health Committee Office
Taro Morita (ext: 123-456)

FIG.21

■ SENDER: Manager Suzuki < t-morita@abc.DEF123.com >  ~21a
■ DESTINATION: BLANK
■ CC: ku#nre%n@ra$ndo-m.com  ~21b
■ TITLE: (Notice & Request) Opening of Safety and Health Committee
■ ATTACHMENT FILE NAME: 12ab34cd.agenda.docx
■ BODY TEXT: ~21c February 22, 2013

Safety and Health Committee

~21d
Safety and Helth Committee members:

(Notice) Opening of Safety and Health Committee

The Safety and Health Committee will be held on March, 2013.
You are kindly invited to attend the Committee.
Please reply to us whether you will or not attend by using the URL below.

http://server1.abcdei123.com/attendance.asp
~21e
----
General Affairs Department
Safety and Health Committee Office
Taro Morita (ext: 123-456)

FIG.22

- SENDER: Jiro Azumi 〈 j-azumi@abc.com 〉
- DESTINATION: Cyber Countermeasure G 〈 cyber-g@mailing-list.abc.com 〉
- TITLE: Seminar Report
- ATTACHMENT FILE NAME: memo130304.docx
- BODY TEXT:

This is Azumi.

Since I attended a seminar of C Corp., yesterday, I am sending you a memorandum.
Please receive this.

Also, C Corp. reports targeted attack.
http://www.c-company.com/spear-phishing-report.pdf
##########
Security Solution Development Section   Jiro Azumi
j-azumi@abc.com   TEL: 012-345-6789

FIG.23

- SENDER: Manager Suzuki < k-suzuki@abc.com >
- DESTINATION: Cyber Countermeasure G < cyber-g@mailing-list.abc.com >
- TITLE: Seminar Report
- ATTACHMENT FILE NAME: memo130304.docx
- BODY TEXT:

Mr. Igawa:

This is from Suzuki.
I have received, from Mr. Tanaka, a draft report of a work group which Mr. Tanaka acts in.
He summarizes 10 important points regarding security in the draft report.

———
Kantaro Suzuki
Security Laboratory
E-mail: k-suzuki@abc.com

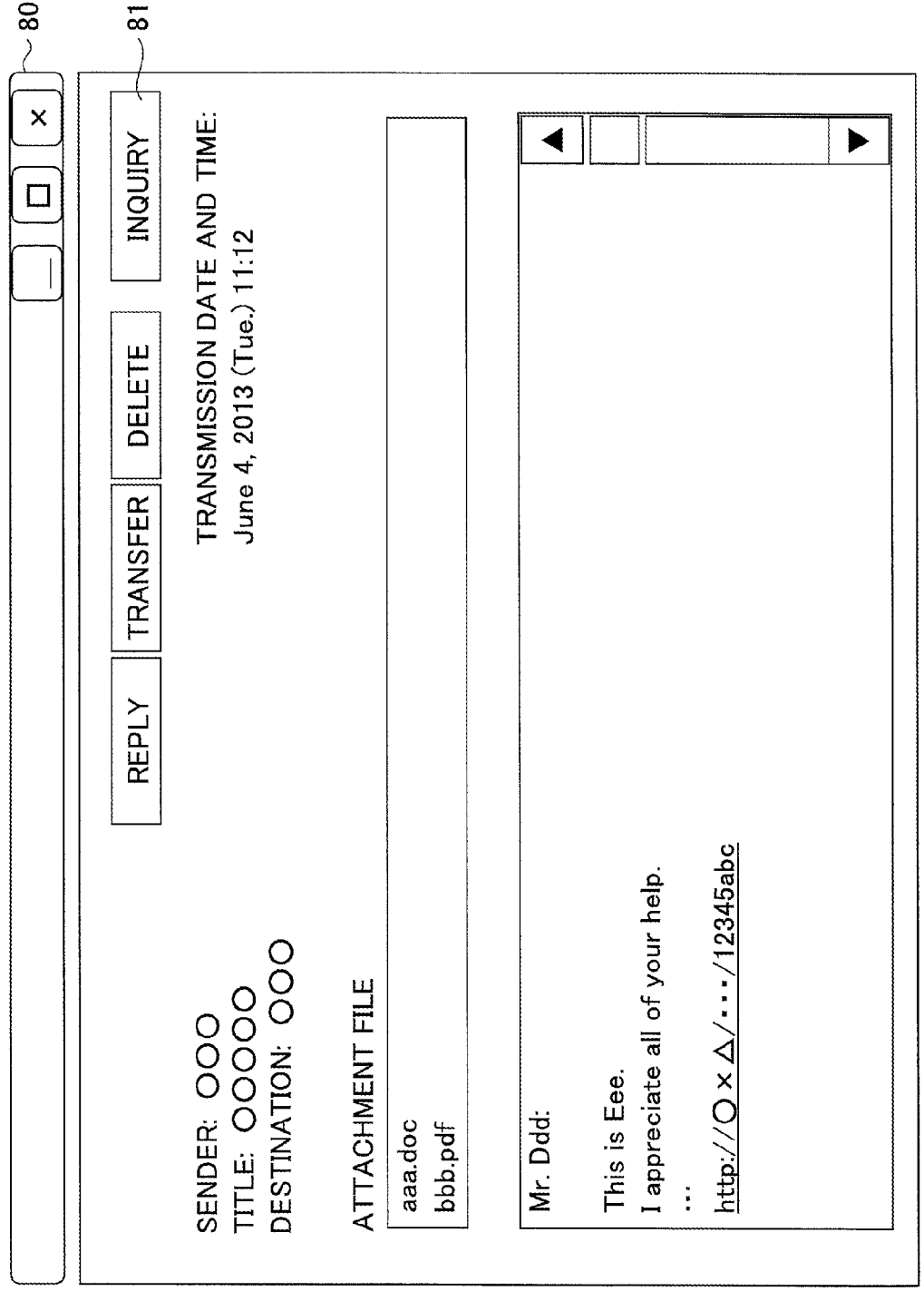

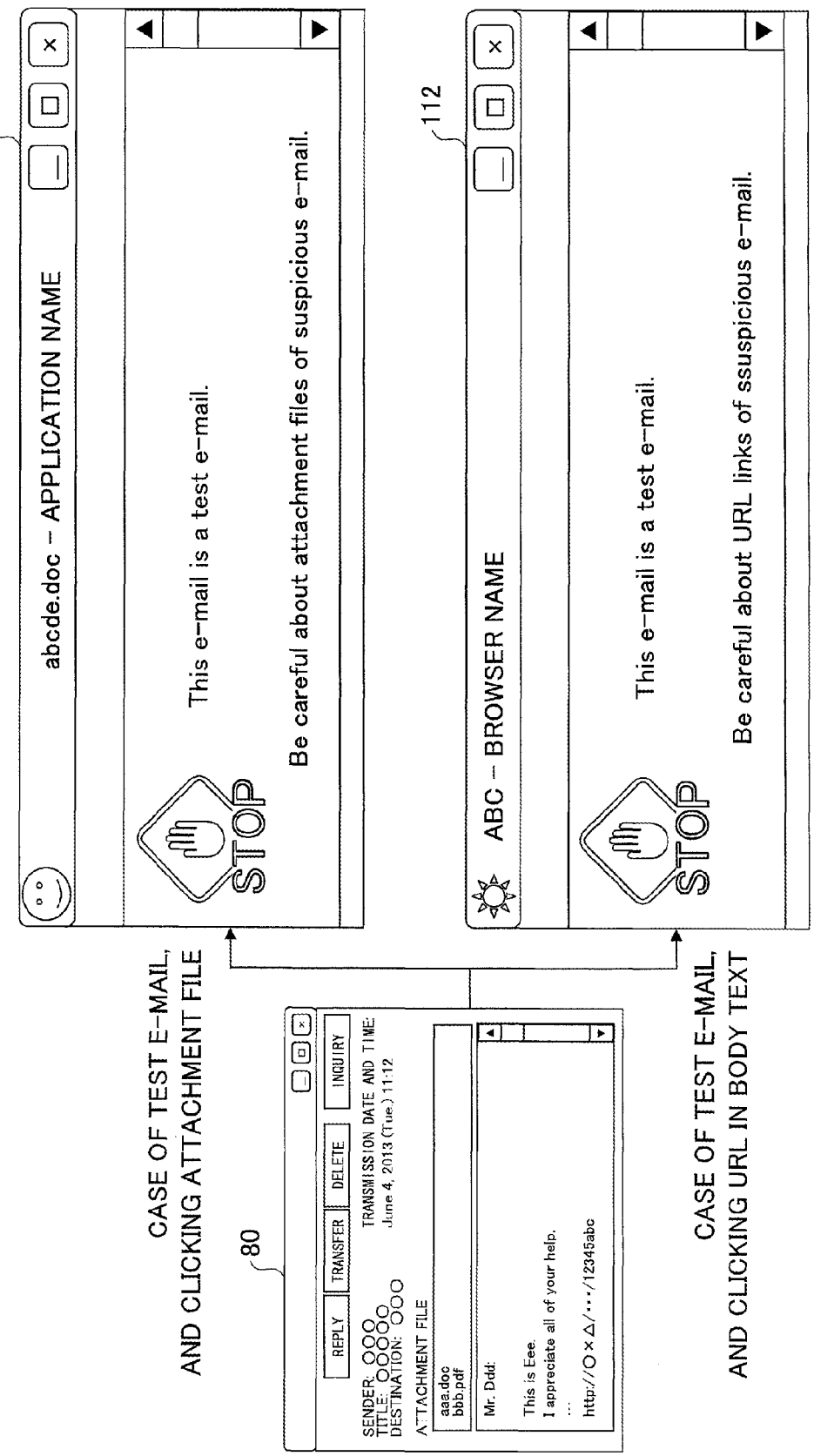

ELECTRONIC MAIL CREATION RECORDING MEDIUM, METHOD, AND INFORMATION PROCESSING APPARATUS

CROSS-REFERENCE TO RELATED APPLICATIONS

This patent application is based upon and claims the benefit of priority of the prior Japanese Patent Application No. 2013-192942 filed on Sep. 18, 2013, the entire contents of which are incorporated herein by reference.

FIELD

The embodiment discussed herein is related to an electronic mail creation recording medium, an electronic mail creation method, and an information processing apparatus.

BACKGROUND

Recently, a "targeted type cyber attack", which targets a specific company for the purpose of confidential information theft or system destruction, has become a problem. A main route to intrude on the Information Technology (IT) of an organization being targeted is via electronic mail (hereinafter, simply called "e-mail"). An e-mail used to intrude is distinguished from a conventional spam e-mail which targets unspecified persons, and is called a "target-type e-mail".

The target-type e-mail is not blocked by an existing anti-virus program or a spam filter. Hence, it is important to respond to such an e-mail at a user side (such as each employee). In this viewpoint, there is a service for sending a test e-mail pretending to be a standard type e-mail to each employee and for conducting feedback depending on a correspondence of each employee for the test e-mail. A technology is known in which if an e-mail includes a Uniform Resource Locator (URL) of a site which is suspected of being illegal, a warning screen and the URL of the site which is suspected of being illegal are displayed.

However, the test e-mail created is common for all employees, since it takes time to create an effective e-mail for each employee individually. In this case, the common e-mail is sent to all employees. Hence, the effectiveness depends on each of the employees. In the above described technology, it is difficult to create a test e-mail appropriately for each of the respective employees.

PATENT DOCUMENTS

Japanese Laid-open Patent Publication No. 2007-202046

SUMMARY

According to one aspect of the embodiment, there is provided an non-transitory computer-readable recording medium storing a program which, when executed by a computer, causes the computer to perform an electronic mail creation process including creating an electronic mail by referring to a storage part in which received electronic mails are stored; using at least one electronic mail of the received electronic mails stored in the storage part, the at least one electronic mail selected based on a criteria being set beforehand; and changing at least one of header information and a body text of the at least one electronic mail.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 3 is a diagram illustrating an example of e-mail data components;

FIG. 4 is a diagram illustrating an example of sender ranking data;

FIG. 5 is a diagram illustrating an example of test e-mail creation criteria;

FIG. 6 is a diagram illustrating an example of test e-mail data;

FIG. 7 is a diagram illustrating an example of a proficiency level change rule;

FIG. 8 is a diagram illustrating an example of proficiency level data;

FIG. 19 is a diagram illustrating a detailed example of the test e-mail to be created (part 1);

FIG. 20 is a diagram illustrating a detailed example of the test e-mail to be created (part 2);

FIG. 21 is a diagram illustrating a detailed example of the test e-mail to be created (part 3);

FIG. 22 is a diagram illustrating a detailed example of the test e-mail to be created (part 4);

FIG. 23 is a diagram illustrating a detailed example of the test e-mail to be created (part 5);

FIG. 24 is a diagram illustrating a screen example;

FIG. 27 is a diagram illustrating message screen examples when an attachment file is opened or a URL is accessed.

DESCRIPTION OF EMBODIMENTS

In the following, embodiments of the present invention will be described with reference to the accompanying drawings.

<Configuration Example of E-mail System

Figure 1:
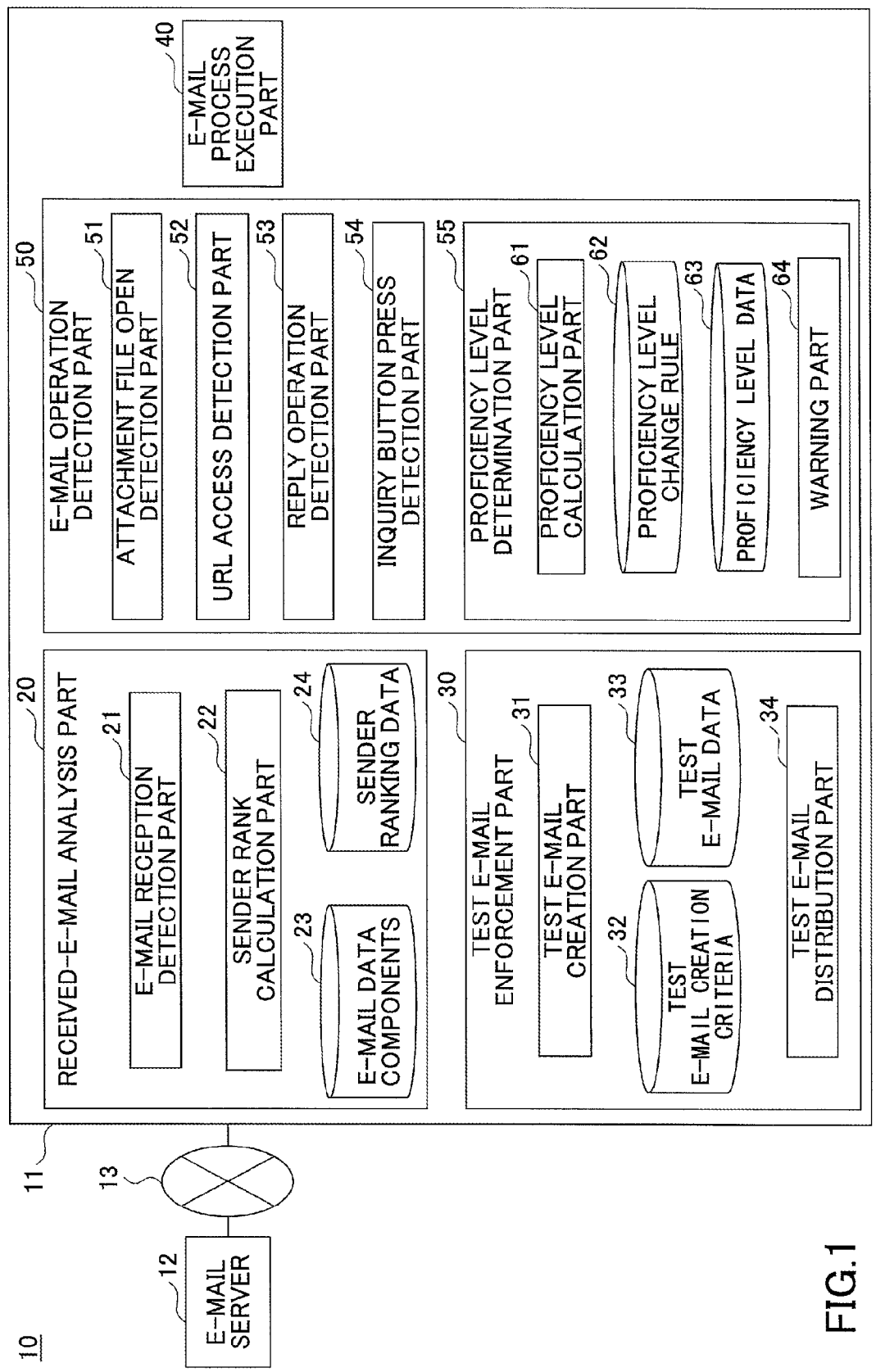
FIG. 1 is a diagram illustrating a configuration example of an e-mail system.

FIG. 1 is a diagram illustrating a configuration example of an e-mail system. An e-mail system 10 depicted in FIG. 1 includes a user terminal 11 and an e-mail server 12. The user terminal 11 and the e-mail server 12 are connected to each other in a state capable of sending and receiving data through a communication network 13 which is represented by an Internet, a Local Area Network (LAN), or the like. In the example in FIG. 1, the user terminal 11 and the e-mail server 12 are connected one-to-one. However, the connection is not limited to the one-to-one connection, and may be a multiple-to-one connection.

The e-mail system 10 depicted in FIG. 1 provides a testing service with respect to a target-type e-mail or the like. The e-mail system 10 sends an e-mail for testing a user (hereinafter, called "test e-mail") which imitates the target-type e-mail, to the user terminal 11 which a user such as an employee or the like uses, without noticing an action date beforehand, and gives a user a pseudo-experience of receiving the target-type e-mail. By this service, it is possible to improve security recognition for each of the employees and to reconfirm an escalation system for abnormal situations of the organization.

The user terminal 11 receives an e-mail sent via the communication network 13 from the e-mail server 12, and performs an e-mail test on each of users by using the e-mail acquired at each of the user terminals 11.

In the embodiment, instead of a simultaneous enforcement initiated by an e-mail security administrator, a tool (such as an application, software, or the like) is installed into each of the user terminals 11 to create and execute the test e-mail. Instead of preparing a subject matter of the test e-mail, the user terminal 11 creates the test e-mail from an e-mail received and acquired at the user terminal 11. In the embodiment, when an e-mail software or the like receives the e-mail, the test e-mail is created by changing a part or the entirety of at least one of header information and body text of the e-mail. However, a creation of the test e-mail is not limited in this manner. One or multiple received e-mails are selected based on a predetermined condition for the test e-mail.

In the user terminal 11, a user who frequently exchanges e-mails is defined as a sender of the test e-mail. Also, the user terminal 11 creates the test e-mail so as to satisfy a predetermined condition and so as to suppress a situation in which the test e-mail influences a business.

Also, the user terminal 11 may create the test e-mail depending on a proficiency level of the employee. The user terminal 11 determines the proficiency level depending on a count of detecting the test e-mail or a count of being taken in by the test e-mail. Then, the user terminal 11 determines the proficiency level of a next test e-mail, and creates the test e-mail in conformity to creation criteria for each of the proficiency levels. The above described creation criteria may define items to mask and a masking degree for the sender, the title, the body text, and the like, and may digitalize the masking degree. However, the creation criteria may not be limited to this manner.

The user terminal 11 may be an information processing apparatus (a computer) such as an information terminal of the like capable of sending and receiving the e-mail of a Personal Computer (PC), a table terminal, a smart phone, a mobile phone, or the like. However, the user terminal 11 is not limited to such devices.

The e-mail server 12 manages transmission of the e-mails to one or multiple user terminal 11 connected to the communication network 13. Also, the e-mail server 12 may manage the proficiency level using the test e-mail with respect to each of the user terminals 11, and may maintain a schedule to enforce the test e-mail and the like.

<Functional Configuration Example of User Terminal 11>

A functional configuration example of the user terminal 11 in the embodiment will be described. The user terminal 11 depicted in FIG. 1 includes a received e-mail analysis part 20, a test e-mail enforcement part 30, an e-mail process execution part 40, and an e-mail operation detection part 50.

In the user terminal 11, the received e-mail analysis part 20 includes an e-mail reception detection part 21, a sender rank calculation part 22, e-mail data components 23, and a sender ranking data 24.

The e-mail reception detection part 21 detects the e-mail which the user terminal 11 receives. As the received e-mail, not only a regular e-mail but also the test e-mail are included. The received e-mail is stored in the e-mail data components 23 as data components of the test e-mail. It is to be noted that the e-mail data components 23 also stores an operation result of the user with respect to each of e-mails acquired by an e-mail operation detection part 50 which will be described later.

The sender rank calculation part 22 monitors receiving the e-mail by the e-mail process execution part 40 and classifies the received e-mail for each of senders. Also, the sender rank calculation part 22 refers to the e-mail data components 23 or the like, and calculates an attachment file open ratio, an access ratio to an URL in the body text, and a reply ratio for each of senders in a constant time period. The constant time period may be arbitrarily set, and may be the nearest week, the nearest month, or the like. Also, the sender rank calculation part 22 stores a calculation result with a received e-mail count and the like for each of the senders in the sender ranking data 24. Moreover, the sender rank calculation part 22 ranks each of the senders by using at least one of the received e-mail count, the access ratio, and the reply ratio, and stores each rank in the sender ranking data 24. It is to be noted that the sender ranking data 24 may be sorted based on the ranking of the senders.

The test e-mail enforcement part 30 includes a test e-mail creation part 31 corresponding to an e-mail creation part, test e-mail creation criteria 32, test e-mail data 33, and a test e-mail distribution part 34.

The test e-mail creation part 31 creates the test e-mail based on the calculation result of the sender rank calculation part 22 by using one or multiple received e-mails. The test e-mail creation part 31 selects a sender (hereinafter, called a "sender A") with whom the e-mail is frequently exchanged and a sender (hereinafter, called a "sender B") based on the test e-mail creation criteria 32. Also, the test e-mail creation part 31 may displace a part or the entirety of components (header information, and the body text) of the e-mail from the sender A with components of the e-mail from the sender B (displacement), and may add a random letter, to create the test e-mail. It is to be noted that a creation method of the test e-mail is not limited to this manner. The test e-mail creation criteria 32 correspond to information in which changed contents of the e-mail from the sender A are defined depending on the proficiency level of the user. However, The test e-mail creation criteria 32 is not limited to this definition manner.

Also, the test e-mail creation part 31 may re-create the test e-mail in a case in which the user does not operate the test e-mail even if a predetermined time (one week or the like) lapses after the test e-mail is distributed to the user.

The test e-mail creation part 31 stores a created e-mail in the test e-mail data 33. The test e-mail distribution part 34 reads out the test e-mail being stored in the test e-mail data 33 at a certain date and time, and outputs the read test e-mail to the e-mail process execution part 40.

The e-mail process execution part 40 browses the received e-mail acquired from the e-mail server 12, opens an attachment file, replies to the received e-mail, creates a new e-mail, and the like. However, operations of the e-mail process execution part 40 are not limited to those. Also, the e-mail process execution part 40 receives the test e-mail which is distributed by the test e-mail enforcement part 30. It is to be noted that the e-mail process execution part 40 is realized by a regular e-mail software (such as Outlook (registered trademark), Thunderbird (registered trademark), or the like). However, the e-mail process execution part 40 is not limited to such e-mail software.

The e-mail operation detection part 50 includes an attachment file open detection part 51, a URL access detection part 52, a reply operation detection part 53, an inquiry button press detection part 54, and a proficiency level determination part 55. The proficiency level determination part 55 includes a proficiency level calculation part 61, a proficiency level change rule 62, proficiency level data 63, and a warning part 64.

The e-mail operation detection part 50 detects e-mail operations of users (the employee or the like). The e-mail operations may include an operation to browse the e-mail, to open a file or the like attached to the e-mail, to access the URL described in the body text of the e-mail, to reply to the received e-mail, to create the new e-mail, and the like. However, the e-mail operations are not limited to the above described operations. The e-mails of detection subjects may be a regular received e-mail, the test e-mail, and the like. Detected information is stored in the e-mail data components 23.

The attachment file open detection part 51 detects that the attachment file of the e-mail is opened, based on contents processed by the e-mail process execution part 40. Also, the attachment file open detection part 51 may separate and store all attachment files of the received e-mails from the body texts of the received e-mails. It is to be noted that a shortcut file to a separated attachment file is set in an attachment file field of the e-mail. An original name may be used for an attachment file name, but is not limited to this manner.

The URL access detection part 52 detects an access to address information of the URL or the like included in the body text of the e-mail. The access is conducted by the e-mail process execution part 40. The URL in the body text of the received e-mail may be accessed via a Web proxy server of the like which is managed beforehand. When the user accesses the URL in the body text of the received e-mail, a message ID of the received e-mail is sent to the URL access detection part 52.

The reply operation detection part 53 monitors the e-mail sent from the e-mail process execution part 40, and detects which the received e-mail is replied to by referring to "In-Reply-To" or the like in the header information. The "In-Reply-To" is a header which is additionally provided to identify an original message when a reply is conducted for a certain message. The "In-Reply-To" may indicate Message-ID or the like of the original message. The reply operation detection part 53 may recognize a reply operation or the like by detecting that a button, which is provided with the e-mail software in the e-mail process execution part 40, is pressed to conduct a reply or a transfer. However, a reply detection may not be limited to this manner.

The inquiry button press detection part 54 detects a press of a button (an inquiry button or the like) which is displayed at a screen or the like by the e-mail process execution part 40. The inquiry button corresponds to a button which is pressed by the user when the user browses the received e-mail and determines that the e-mail is the test e-mail. The button is pressed by using an input device such as a mouse, a keyboard, or the like. It is to be noted that the inquiry button press detection part 54 may determine whether the button is pressed before a certain time lapses based on a time distributed by the test e-mail distribution part 34 which is set as a reference time.

The proficiency level determination part 55 determines the proficiency level of the user with respect to the above described target-type e-mail depending on the count that the user to detect the test e-mail or the count that the user is taken by the test e-mail, and determines the proficiency level of the next test e-mail.

The proficiency level calculation part 61 increases the proficiency level from a current value if the e-mail to which the user presses the inquiry button is the test e-mail. Also, the proficiency level calculation part 61 alerts the user if the user accesses the attachment file of the test e-mail or the URL in the body text of the test e-mail, or replies to the test e-mail, and decreases the proficiency level from the current value. A change of the above described proficiency level may be set based on the proficiency level change rule 62 which is set beforehand, but is not limited to this manner.

The proficiency level calculation part 61 may determine whether a reply button is pressed by checking "Message-ID information" of a reply originator e-mail. However, a determination of pressing the reply button is not limited this manner.

Also, the proficiency level calculation part 61 outputs an original e-mail to the e-mail software of the e-mail process execution part when the original e-mail used for the test e-mail is a new e-mail which the user has not viewed yet.

The proficiency level calculation part 61 instructs the test e-mail creation part 31 to create (re-create) a new test e-mail if there is no operation of the user with respect to the test e-mail even after a constant time period (such as 2 days or the like) lapses. In this case, the proficiency level of the user is not changed. The proficiency level calculation part 61 stores an acquired proficiency level in the proficiency level data 63.

The warning part 64 conducts a so-called "revealing a trick" to report whether the e-mail is the test e-mail when the user suspects a possibility of the test e-mail and presses the "inquiry button" being arranged beforehand is pressed. The warning part 64 determines whether the e-mail is the test e-mail when the user presses the above described inquiry button, and displays a warning (a message) such as "This e-mail is not the test e-mail" or the like at a screen of the user terminal 11 when the e-mail is not the test e-mail. Also, the warning part 64 displays another warning corresponding to the proficiency level of the user acquired by the proficiency level calculation part 61 when the inquiry button is pressed and the e-mail is the test e-mail. The warning part 64 displays a warning screen corresponding to a value of an "access content", a "newly arrived e-mail usage", or the like of the test e-mail data 33.

It is to be noted that various sets of data such as the e-mail data components 23, the sender ranking data 24, the test e-mail creation criteria 32, the test e-mail data 33, the proficiency level change rule 62, the proficiency level data 63, and the like in the user terminal 11 may be maintained in a single storage device. Also, the above described various sets of data may be provided in an external device connected via the communication network 13. The external device may be accessed when the data are read out or written in.

In the embodiment, the test e-mail is created in which the test e-mail satisfies a condition, and a measure is implemented in the test e-mail to suppress an influence to the business. Based on the content of the access to the attachment file or the URL by the user, the proficiency level of the user for the test e-mail is determined. In the embodiment, by determining a difficulty level of the next test e-mail, it is possible to create an appropriate test e-mail for each of the users.

It is to be noted that in the e-mail system 10 depicted in FIG. 1, functions of the received e-mail analysis part 20, the test e-mail enforcement part 30, and the e-mail operation detection part 50 are provided to the user terminal 11, but are not limited to this implementation. Alternatively, these functions may be provided to the e-mail server 12. That is, in the embodiment, it is possible for the above described user terminal 11 and the e-mail server 12 to include functions as an e-mail creation apparatus (the information processing apparatus) which creates the above described test e-mail.

By providing each of the above described functions to the e-mail server 12, it is possible to unify management of the proficiency level of the target-type e-mail using the test e-mail for the multiple user terminal 11. Also, it is possible to maintain an enforcement schedule and the like of the test e-mail. Also, by providing each of the above described functions to the e-mail server 12, it is possible to apply the embodiment to a Web e-mail and the like using an Internet browser or the like. Moreover, in the embodiment, each of the above described functions may be realized by a cloud computing including one or more information processing apparatuses.

<Hardware Configuration Example of User Terminal 11>

Figure 2:
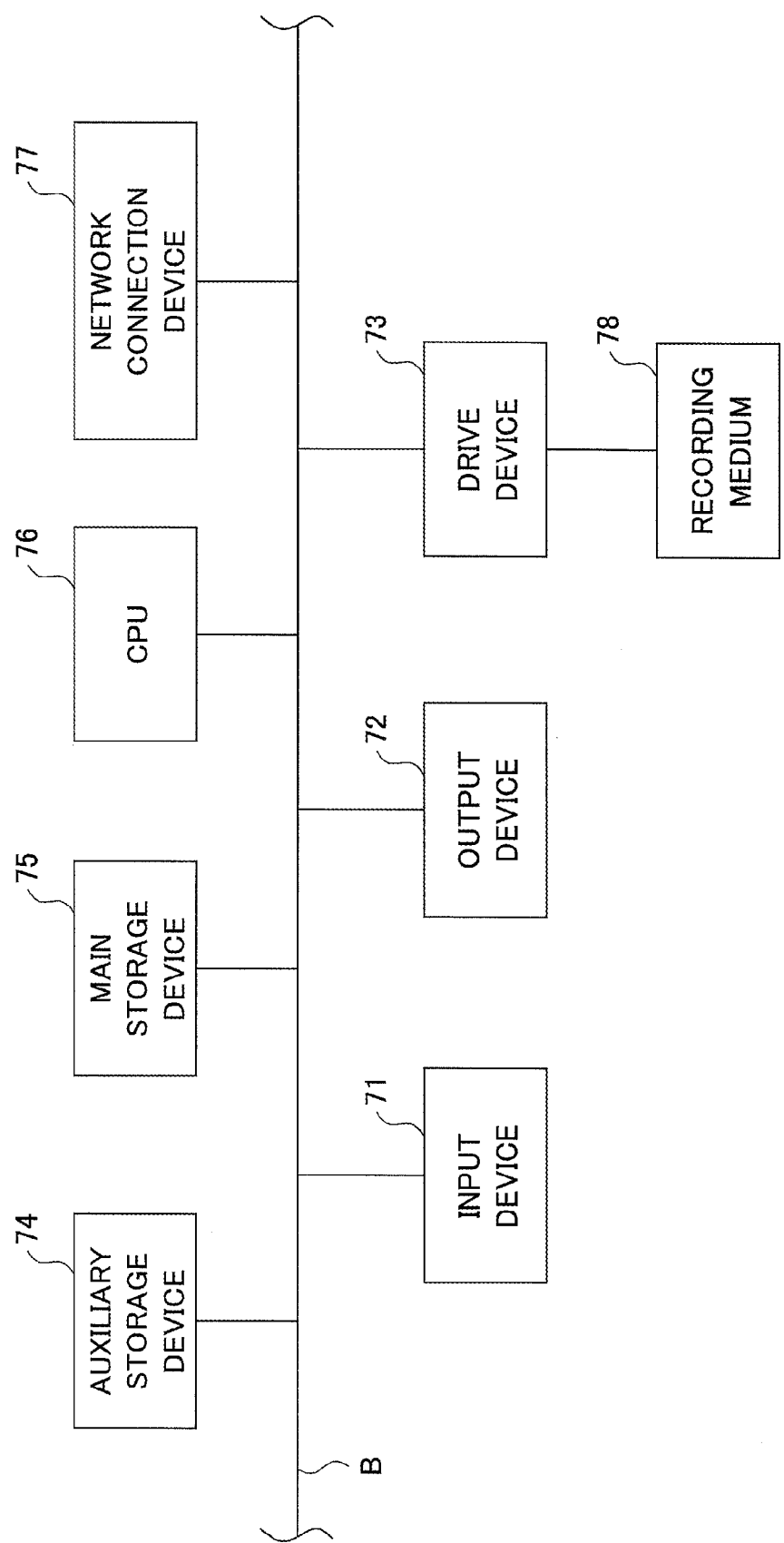
FIG. 2 is a diagram illustrating a hardware configuration example of a user terminal.

Next, a hardware configuration example of the user terminal 11 will be described. FIG. 2 is a diagram illustrating a hardware configuration example of the user terminal. In the example depicted in FIG. 2, the user terminal 11 includes an input device 71, an output device 72, a drive device 73, an auxiliary storage device 74, a main storage device 75, a processor such as a Central Processing Unit (CPU) 76, and a network connection device 77, which are mutually connected via a system bus B.

The input device 71 accepts inputs such as an execution instruction of a program from the user using the user terminal 11 or the like, various operation information items, software, information for activating software or the like. The input device 71 includes a keyboard and pointing device such as a mouse or the like for the user to operate the user terminal 11, and a sound input device such as a microphone or the like.

The output device 72 includes a display which displays various windows, data, and the like necessary to operate the user terminal 11 in the embodiment, and displays, by a control program included in the CPU 76, an execution progress, and results, and the like of the program at a screen.

An execution program to be installed in a main body of a computer of the user terminal 11 or the like may be provided by a recording medium 78 or the like. The recording medium 78 recording the program is set to the drive device 73. Based on a control signal from the CPU 76, the execution program included in the recording medium 78 is installed to the auxiliary storage device 74 through the drive device 73 from the recording medium 78.

The auxiliary storage device 74 stores the execution program, the control program provided to the computer, and the like based on the control signal from the CPU 76, and inputs and outputs as necessary. The auxiliary storage device 74 reads information from various sets of information being stored and writes data based on the control signal or the like from the CPU 76. The auxiliary storage device 74 may correspond to a storage part such as a Hard Disk Drive (HDD), a Solid State Drive (SSD), or the like. The auxiliary storage device 74 stores the above described e-mail data components 23, the sender ranking data 24, the test e-mail creation criteria 32, the test e-mail data 33, the proficiency level change rule 62, the proficiency level data 63, and the like.

The main storage device 75 temporarily stores at least a part of an Operating System (OS) and application programs which are executed by the CPU 76. Moreover, the main storage device 75 stores various sets of data necessary for processes conducted by the CPU 76. The main storage device 75 may be a Read Only Memory (ROM), a Random Access Memory (RAM), or the like.

The CPU 76 realizes each of processes by controlling an input and an output of data to and from each of various calculations and each of hardware components, processes of the entirety of the computer of the user terminal 11 based on the control program such as the OS or the like, the execution program being stored in the main storage device 75. During an execution of the program, each of various sets of information may be acquired from the auxiliary storage device 74, and an execution result and the like may be stored.

The CPU 76 conducts a process corresponding to the program in the main storage device 75 by executing the program (which may be the e-mail creation program) being installed in the auxiliary storage device 74 based on an execution instruction or the like of the program which is input from the input device 71. The CPU 76 conducts a process for analyzing the received e-mail by the received e-mail analysis part 20, a process for creating the test e-mail by the test e-mail enforcement part 30, a process for executing an e-mail process by the e-mail process execution part 40, and the like by executing the e-mail creation program. Moreover, the CPU 76 conducts processes for detecting the e-mail operation and for calculating the proficiency level by the e-mail operation detection part 50. However, process contents by the CPU 76 are not limited to the above described processes. Contents executed by the CPU 76 are stored in the auxiliary storage device 74 as necessary.

The network connection device 77 conducts communications with the e-mail server 12 and the like by connecting to the communication network 13 based on the control signal from the CPU 76. Also, the network connection device 77 acquires the execution program, the application, the software, setting information, and the like from the external device or the like being connected to the communication network 13. Moreover, the network connection device 77 may provide the execution result acquired by executing the program or the execution program itself in the embodiment to the external device or the like.

The recording medium 78 may be a computer-readable recording medium in which the above described execution program and the like are stored. The recording medium 78 may be a semiconductor memory such as a flash memory or the like, or a portable type recording medium such as a Compact Disc Read-Only Memory (CD-ROM), a Digital Versatile Disk (DVD), or the like. However, the recording medium 78 is not limited to such media.

By the above described hardware configuration, the e-mail creation process in the embodiment is executed. In the embodiment, by installing the execution program (the e-mail creation program) for causing the computer to realize each of the functions, the e-mail creation process in the embodiment is realized by cooperation of hardware resources and the software. It is to be noted that the same configuration may be applied to the e-mail server 12.

<Various Examples of Data>

Next, various examples of data used in the embodiment will be described with reference to figures.

<Example of E-mail Data Components 23>

FIG. 3 is a diagram illustrating an example of the e-mail data components. The e-mail data components 23 depicted in FIG. 3 may include items of "MESSAGE-ID", "SENDER E-MAIL ADDRESS", "TITLE", "BODY TEXT", "ATTACHMENT FILE", "URL", "ATTACHMENT OPEN FLAG", "URL ACCESS FLAG", "REPLY FLAG", "INQUIRY FLAG", and the like. However, items of the e-mail data components 23 are not limited these.

The "MESSAGE-ID" indicates information of a Message-ID which is provided to identify each e-mail. The "SENDER E-MAIL ADDRESS" indicates information for identifying a sender of a received e-mail, and is an example of the header information. The "TITLE" indicates information of a title being set to the received e-mail, and is an example of the header information. The e-mail data components 23 may store the header information other than the "SENDER E-MAIL ADDRESS" and the "TITLE". The "BODY TEXT" indicates information of the body text being set in the received e-mail.

The "ATTACHMENT FILE" stores information of the file name when the received e-mail includes the attachment file. When the attachment file is not included, the "ATTACHMENT FILE" indicates blank (a "Null" state). It is to be noted in that in the embodiment, not only the attachment file name but also a content itself of the attachment file may be stored. The "URL" stores address information when the body text includes the address information of a link destination such as the URL. The "URL" indicates blank when an access destination (URL) is not included.

The "ATTACHMENT OPEN FLAG" indicates whether the user opens the attachment file of the received e-mail, or the like. When the user opens the attachment file, a value "1" may be stored to the "ATTACHMENT OPEN FLAG". When the user does not open the attachment file, a value "0" may be stored to the "ATTACHMENT OPEN FLAG". When the attachment file is not attached to the received e-mail, the "ATTACHMENT OPEN FLAG" indicates blank. The value of the "ATTACHMENT OPEN FLAG" is not limited to this manner. Alternatively, the "ATTACHMENT OPEN FLAG" may be set only if the attachment file is opened.

The "URL ACCESS FLAG" indicates whether the user accesses a site of the URL in the body text of the received e-mail. When the user accesses the URL, a value "1" is stored in the "URL ACCESS FLAG". When the URL is described in the body text but is not accessed, a value "0" is stored in the "URL ACCESS FLAG". When there is no URL in the body text, the "URL ACCESS FLAG" indicates blank. However, the value of "URL ACCESS FLAG" is not limited to this manner.

The "REPLY FLAG" indicates information used to determine whether the user replies to the received e-mail. When the user replied, a value "1" is set to the "REPLY FLAG". When the user does not reply, a value "0" is set to the "REPLY FLAG". However, the value of the "REPLY FLAG" is not limited to this manner.

The "INQUIRY FLAG" indicates information used to determine whether the user inquiries with respect to the received e-mail. When the user inquires, a value "1" is stored to the "INQUIRY FLAG". When the user does not inquire, a value "0" is stored to the "INQUIRY FLAG". However, the value of the "INQUIRY FLAG" is not limited to this manner.

The e-mail reception detection part 21 stores the received e-mail in the e-mail data components 23. The test e-mail creation part 39 may refer to the e-mail data components 23 when creating the test e-mail. For each set of data in the e-mail data components 23 in FIG. 3, the e-mail operation detection part 50 may add or modify or the like.

<Example of Sender Ranking Data 24>

FIG. 4 is a diagram illustrating an example of the sender ranking data. The sender ranking data 24 depicted in FIG. 4 may include items of "SENDER E-MAIL ADDRESS", "RECEIVED E-MAIL COUNT", "REPLY RATIO (%)", "ACCESS RATIO (%)", "RANK", and the like. However, the items of the sender ranking data 24 are not limited to these.

The "SENDER E-MAIL ADDRESS" indicates information for identifying a sender of the received e-mail. It is to be noted that in an example in FIG. 3, an e-mail address of the sender is stored. The information is not limited to the e-mail address of the sender. Alternatively, an address book or the like may be prepared beforehand and associated with the sender ranking data 24. Then, a sender name or the like may be stored in the "sender e-mail address".

The "RECEIVED E-MAIL COUNT" indicates a count of the received e-mails for each of the senders. The "REPLY RATIO (%)" indicates a ratio of the reply e-mail with respect to the received e-mail. The "REPLY RATIO (%)" may indicate 80% in a case of replying to eight of ten received e-mails.

The "ACCESS RATIO (%)" indicates a ratio of the received e-mails which the user opened once or accessed the URL in a case in which a file is attached to the received e-mail, there is the address information of a link destination such as the URL in the body text of the received e-mail. That is, if the user opens the attachment file once or accesses the URL with respect to seven of ten received e-mails, the "ACCESS RATIO (%)" indicates 70%.

The "RANK" indicates a rank based on the above described received e-mail count, the reply ratio, the access ratio, and the like. The rank may be set in a descending order of the reply ratio or the access ratio, or the rank may be set based on a result from multiplying both the reply ratio and the access ratio. However, the setting method for the "RANK".

The sender rank calculation part 22 calculates the received e-mail count, the reply ratio, and a URL access ratio for each of the senders related to the received e-mails in a certain time period (which may be one month or the like), and ranks based on a calculation result.

<Example of Test E-mail Creation Criteria 32>

FIG. 5 is a diagram illustrating an example of the test e-mail creation criteria. The test e-mail creation criteria 32 depicted in FIG. 5 includes items of "PROFICIENCY LEVEL", "RANK OF SENDER B", "SENDER E-MAIL ADDRESS", "TITLE", "ATTACHMENT FILE NAME OR URL LETTER STRING IN BODY TEXT", "BODY TEXT", "DESTINATION", "DISTRIBUTION PERIOD", and the like. However, the items of the test e-mail creation criteria 32 are not limited to these.

It is to be noted that in the example in FIG. 5, test e-mail creation criteria are indicated for a case in which the received e-mails from two different senders A and B are used. In this case, the received e-mail from the sender A is regarded as a base e-mail (a main e-mail), and the received e-mail from the sender B is regarded as a sub e-mail. Also, in the example in FIG. 5, changed contents of the main e-mail are defined depending on the proficiency level of the user.

The "PROFICIENCY LEVEL" indicates the proficiency level for the target-type e-mail using the test e-mail. The "RANK OF SENDER B" indicates an extraction reference of the sender B of the sub e-mail which is selected depending on the proficiency level. The extraction reference corresponds to information indicating whether to replace the e-mail address of the sender when the test e-mail is created, and indicating a replacement method. In the example in FIG. 5, "REPLACE+ADD RANDOM LETTER" indicates that the sender of the main e-mail (sender A) is replaced with another sender of the sub e-mail (sender B), and a random letter is further added to the e-mail address of the sender of the main e-mail.

The "TITLE" indicates a creation reference of a title of the test e-mail. In the example in FIG. 5, "REPLACE+ DISPLACE WITH LITERAL ERROR" indicates that the title of the main e-mail is replaced with that of the sub e-mail, and a certain letter is further displaced with a literal error. Also, "REPLACE+WORD URGING TO OPEN" indicates that the title of the main e-mail is replaced with that of the sub e-mail, and a word is further inserted. The word may be "URGENT", "EMERGENCY", or the like to urge the user to open the received e-mail. Moreover, "REPLACE+WORD ASSUMING THAT E-MAIL WAS PREVIOUSLY TRANSMITTED" indicates that the title of the main e-mail is replaced with that of the sub e-mail, and a word such as "RE-SEND", "TRANSFER", or the like is further added to assume that there is the e-mail which was previously transmitted. Furthermore, "replace+add "Re:" or "FW:"" indicates that the title of the main e-mail is replaced with that of the sub e-mail, and "Re:", "FW:", or the like is further added to a beginning of the tile.

The "ATTACHMENT FILE NAME OR URL LETTER STRING IN BODY TEXT" indicates a creation reference of a URL letter string to be added in the file attached to the test e-mail or the body text of the test e-mail. The "BODY TEXT" indicates a creation reference of the body text of the test e-mail. The "DESTINATION" indicates a creation reference of a destination of the test e-mail. The "DISTRIBUTION PERIOD" indicates an example of a distribution period corresponding to the proficiency level. In the "DISTRIBUTION PERIOD", "3 times per month" indicates that the test e-mail is sent 3 times per month.

The above described sender A may be randomly selected from senders ranking in the top 33% by the test e-mail creation part 31. That is, in a case in which ten senders are ranked, one sender is randomly selected from number 1 to number 3 ranking in the top 33%. Also, the test e-mail creation part 31 randomly selects the sender B from one or multiple senders within certain ranks depending on a current proficiency level of the user based on the test e-mail creation criteria 32.

It is to be noted that the example in FIG. 5 is set so that the higher the proficiency level is, the sender is selected from the higher ranks, since the user is less cautious for the senders in the higher ranks. It is to be noted that a setting method is not limited to this manner. Also, in a case of using the newly arrived e-mail as the main e-mail, it may be checked whether the sender is ranked in the top 33%. Then, if the newly arrived e-mail is sent from the sender ranking in the top 33%, the test e-mail may be created.

<Example of Test E-mail Data 33>

FIG. 6 is a diagram illustrating an example of the test e-mail data. The test e-mail data 33 may include items of "MESSAGE-ID OF TEST E-MAIL", "DISTRIBUTION DATE AND TIME", "ACCESS COMPLETION FLAG", "ACCESS CONTENT", "NEWLY ARRIVED E-MAIL USAGE", "MESSAGE-ID OF NEWLY ARRIVED E-MAIL", and the like. However, the items of the test e-mail data 33 are not limited to these.

The "MESSAGE-ID OF TEST E-MAIL" indicates information for identifying the test e-mail. The information set in "MESSAGE-ID OF TEST E-MAIL" may be used to determine whether the user opens the attachment file of the test e-mail, accesses the URL, presses the reply button, presses the inquiry button, or the like.

The "DISTRIBUTION DATE AND TIME" indicates date and time information when the test e-mail is distributed. The "ACCESS COMPLETION FLAG" indicates information to determine whether the user accesses the test e-mail. If the user accesses other than viewing the body text of the test e-mail, the proficiency level is updated based on the access content and the access completion flag is changed from "0" to "1". However, a value setting to the "ACCESS COMPLETION FLAG" is not limited to this manner.

The "ACCESS CONTENT" indicates an access state of the user with respect to the test e-mail. In the example in FIG. 6, "NOT ACCESSED" indicates a state in which the test e-mail is not accessed, "ATTACHMENT" indicates a state in which the attachment file is opened, "INQUIRY" indicates a state in which the inquiry button set on the screen is pressed, and "REPLY" indicates a state in which a reply operation is conducted with respect to the test e-mail. Also, in the example in FIG. 6, "URL" indicates a state in which the URL (address) in the body text of the test e-mail is accessed. However, the "ACCESS CONTENT" is not limited to these values.

The "NEWLY ARRIVED E-MAIL USAGE" indicates whether the newly arrived e-mail is used for the test e-mail. The "NEWLY ARRIVED E-MAIL USAGE" indicates "1" when the newly arrived e-mail is used. The "NEWLY ARRIVED E-MAIL USAGE" indicates "0" when the newly arrived e-mail is not used. The "MESSAGE-ID OF NEWLY ARRIVED E-MAIL" corresponds to information for identifying an original newly arrived e-mail when a newly arrived message is used for the test e-mail.

The test e-mail enforcement part 30 may distribute the test e-mail at the distribution date and time. The proficiency level determination part 55 of the e-mail operation detection part 50 may instruct the test e-mail creation part 31 to create a new test e-mail when the user has not accessed the test e-mail, which is distributed at the distribution date and time, for a constant time period. Also, the proficiency level determination part 55 does not change the proficiency level even if the test e-mail is accessed in which the access completion flag indicates "1" for the test e-mail. In this case, the warning part 64 may display a warning message similar to a previous one at the screen.

<Example of Proficiency Level Change Rule 62>

FIG. 7 is a diagram illustrating an example of the proficiency level change rule. The proficiency level change rule 62 may include items of "ACCESSED E-MAIL", "ACCESS DETAILS", "CHANGE VALUE OF PROFICIENCY LEVEL" and the like. However, the items of the proficiency level change rule 62 are not limited to these.

The "ACCESSED E-MAIL" indicates information used to determine whether the e-mail accessed by the user is the test e-mail. The "ACCESS DETAILS" indicates details of an access of the user. The "CHANGE VALUE OF PROFICIENCY LEVEL" indicates an increase or an decrease to the current proficiency level of the user with respect to the accessed e-mail and the access details.

The proficiency level may be increased or decreased based on the proficiency level change rule 62 when a certain access is conducted to the received e-mail and when a type of the e-mail being accessed and the access details correspond to a certain condition as depicted in FIG. 7. However, a change of the proficiency level is not limited to this manner. In the embodiment, as depicted in FIG. 7, a change value may be 0 (zero) as depicted in FIG. 7.

<Example of Proficiency Level Data 63>

FIG. 8 is a diagram illustrating an example of the proficiency level data. The proficiency level data 63 may include items of "PROFICIENCY LEVEL", "UPDATED DATE AND TIME", "MESSAGE-ID OF test E-MAIL", and the like. However, the items of the proficiency level data 63 are not limited to these.

The "PROFICIENCY LEVEL" indicates the proficiency level of the user on the updated date and time. The "UPDATED DATE AND TIME" indicates date and time information when a proficiency level determination being accompanied with the enforcement of the test e-mail is conducted and a determined proficiency level is stored in the proficiency level data 63. The "MESSAGE-ID OF TEST E-MAIL" indicates information used to identify the test e-mail.

The proficiency level data 63 may be associated with the test e-mail data 33 by the "MESSAGE-ID OF test E-MAIL". By this association, it is referred to which test e-mail the user accessed and how the user accessed the test e-mail.

<Example of E-mail Creation Process in Embodiment>

Figure 9:
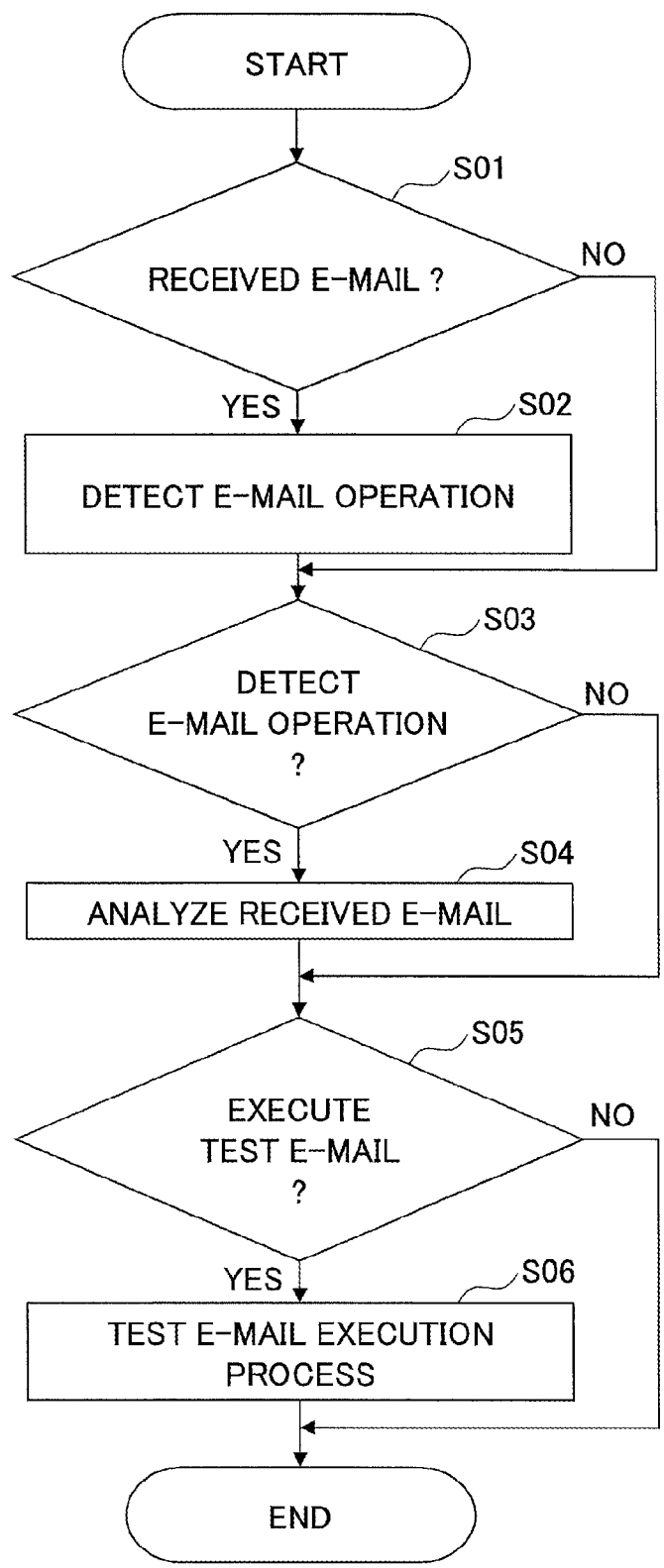
FIG. 9 is a flowchart for explaining an example of an e-mail creation process.

Next, an example of the e-mail creation process in the embodiment will be described with reference to the following flowchart. FIG. 9 is a flowchart for explaining the example of the e-mail creation process in the embodiment.

In the example in FIG. 9, the user terminal 11 determines whether the e-mail is received through the communication network 13 from the e-mail server 12 or the like (step S01). When receiving the e-mail (YES in step S01), the user terminal 11 detects an e-mail operation of the user with respect to the received e-mail (step S02). It is to be noted that in a process in step S02, the user terminal 11 may detect the e-mail operation such as a creation of a new e-mail or the like.

Also, when receiving the e-mail (NO in step S01) or after the process in step S02, the user terminal 11 determines whether the e-mail operation is detected (step S03). When detecting the e-mail operation (YES in step S03), the user terminal 11 analyses the received e-mail.

Also, when detecting the e-mail operation (NO in step S03) or after a process in step S04, the user terminal 11 determines whether to execute the test e-mail based on the distribution period depending on the proficiency level of the user (step S05). When executing the test e-mail (YES in step S05), the user terminal 11 performs enforcement processes of the test e-mail such as a creation process of the test e-mail, a distribution process, a detection process of the e-mail operation, a determination process of the proficiency level, and the like (step S06), and terminates this e-mail creation process. Also, when the user terminal 11 does not execute the test e-mail (NO in step S05), the user terminal terminates this e-mail creation process. It is to be noted that the e-mail creation process depicted in FIG. 9 may be repeated during an operation of the e-mail system 10.

<Example of E-mail Operation Detection Process>

Figure 10:
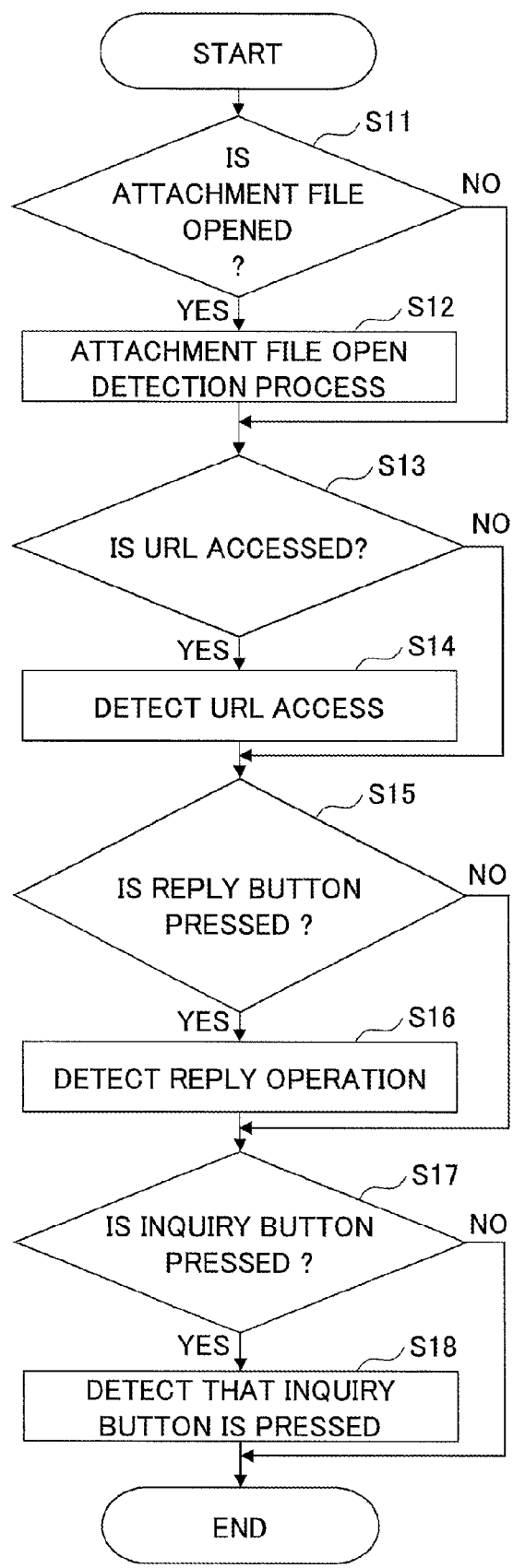
FIG. 10 is a flowchart for explaining an example of an e-mail operation detection process.

Next, an example of an e-mail operation detection process in step S02 in FIG. 9 will be described with reference to the following flowchart. FIG. 10 is a flowchart for explaining the example of the e-mail operation detection process.

In the example in FIG. 10, the e-mail operation detection part 50 determines whether the attachment file being attached to the e-mail is opened (step S11). When the attachment file is opened (YES in step S11), an attachment file detection process is conducted (step S12).

On the other hand, when the attachment file is not opened (NO in step S11) or after a process in step S12, the e-mail operation detection part 50 determines whether the user accesses the address information of the URL or the like in the body text of the e-mail (step S13). When the address information of the URL or the like is accessed (YES in step S13), the e-mail operation detection part 50 conducts an access detection process of the URL (step S14).

On the other hand, when the address information of the URL or the like is not accessed or after a process in step S14, the e-mail operation detection part 50 determines whether a reply button is pressed (step S15). It is to be noted that in a process in step S15, the determination is not limited to pressing of the reply button and may be conducted by checking whether a transfer button or the like is pressed. When the reply button is pressed (YES in step S15), the e-mail operation detection part 50 conducts a detection process of a reply operation (step S16).

On the other hand, when the reply button is not pressed (NO in step S15) or after a process in step S16, the e-mail operation detection part 50 determines whether the inquiry button is pressed (step S17). The inquiry button is pressed when the user determines that the e-mail being browsed by the user is the test e-mail. When the inquiry button is pressed (YES in step S17), the e-mail operation detection part 50 conducts an inquiry button press detection process (step S18). On the other hand, when the inquiry button is not pressed (NO in step S17) or after the inquiry button press detection process in step S18, the e-mail operation detection part 50 terminates this e-mail operation detection process.

<Example of Attachment File Open Detection Process (Step S12)>

Figure 11:
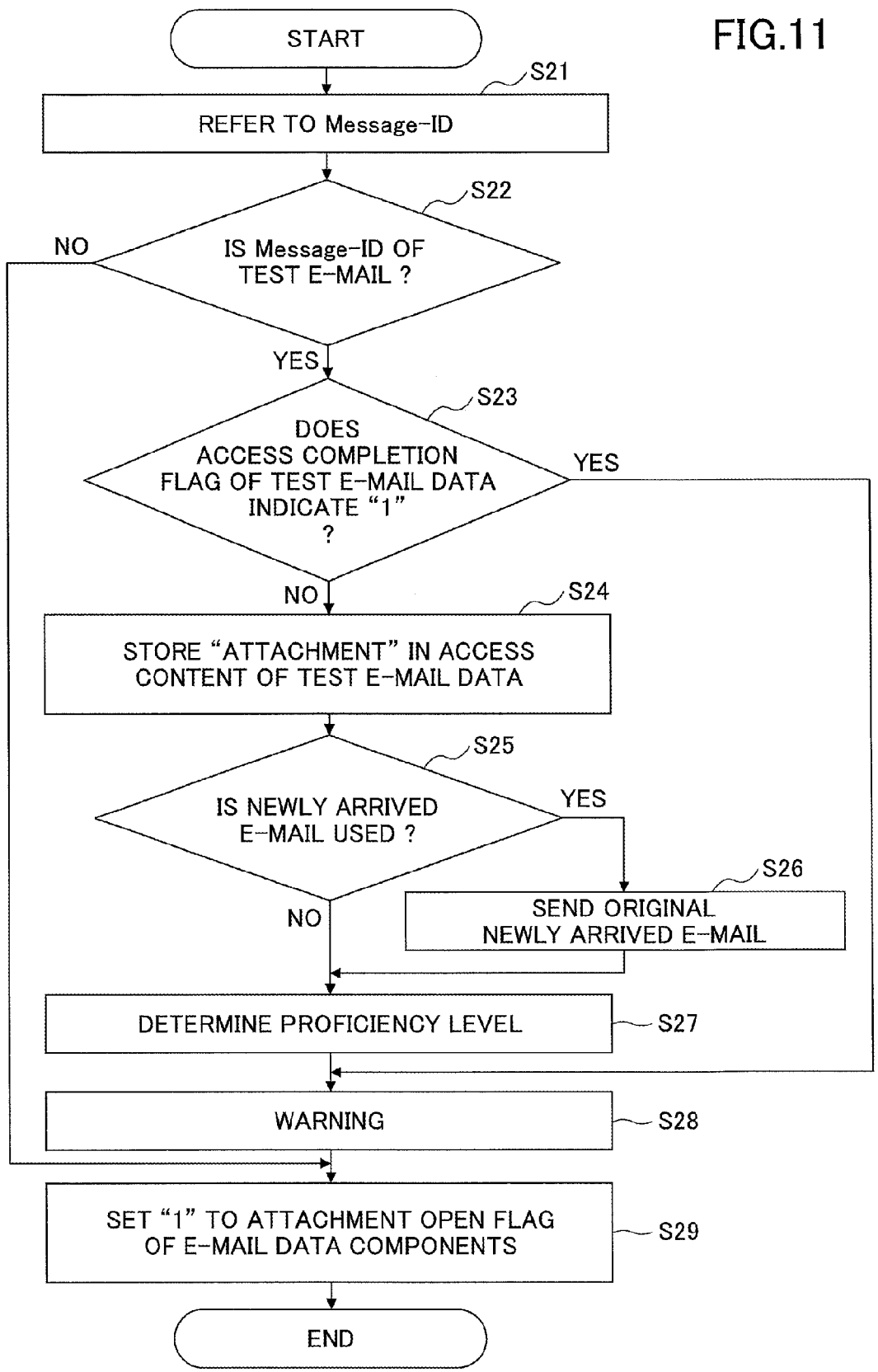
FIG. 11 is a flowchart for explaining an example of an attachment file open detection process.

Next, an example of an attachment file open detection in step S12 in FIG. 10 will be described with reference to the following flowchart. FIG. 11 is a flowchart for explaining the example of the attachment file open detection in the embodiment. In the example in FIG. 11, the attachment file open detection part 51 refers to the Message-ID of the e-mail in which the attachment file is opened (step S21), and determines whether the referred Message-ID is the Message-ID of the test e-mail (step S22).

When the referred Message-ID is the Message-ID of the test e-mail (YES in step S22), the attachment file open detection part 51 determines whether the access completion flag of the test e-mail data 33 indicates "1" (step S23). It is to be noted that the test e-mail has accessed when the access completion flag indicates "1". When the access completion flag of the test e-mail data 33 indicates "1" (YES in step S23), the attachment file open detection part 51 stores "ATTACHMENT" in the access details of the test e-mail data 33 (step S24).

Next, the attachment file open detection part 51 determines whether the newly arrived e-mail is used as the test e-mail (step S25). When the newly arrived e-mail is used (YES in step S25), the attachment file open detection part 51 sends an original newly arrived e-mail to the e-mail process execution part 40 (corresponding to the e-mail software)

(step S26). The original newly arrived e-mail includes an original attachment file. It is to be noted that it is set beforehand whether to use the newly arrived e-mail as the test e-mail. However, it is not limited to this manner.

When the newly arrived e-mail is not used (NO in step S25) or after a process in step S26, the proficiency level determination part 55 determines the proficiency level based on the proficiency level change rule 62 (step S27). Also, in a process in step S23, when the access completion flag of the test e-mail data 33 does not indicate "1" (NO in step S23) or after a process in step S27, the proficiency level determination part 55 conducts the warning (step S28). The warning may correspond to the proficiency level. It is to be noted that in a process in step S28, the warning message corresponding to the proficiency level, which is determined beforehand, may be displayed at the screen, or sound may be output. However, the warning message is not limited to this manner.

On the other hand, in a process in step S22, when the referred message-ID is not the message-ID of the test e-mail (NO in step S22) or after a process in step S28, a value "1" is set to the attachment open flag of the e-mail data components 23 (step S29).

<Example of URL Access Detection Process (Step S14)>

Next, an example of the URL access detection process in step S14 will be described with reference to the following flowchart. It is to be noted that a setting may be conducted so as that a Web access is performed via a proxy server or the like when the URL in the body text in the e-mail is pressed. The URL access may be detected. However, a method for detecting the URL access is not limited to this manner.

Figure 12:
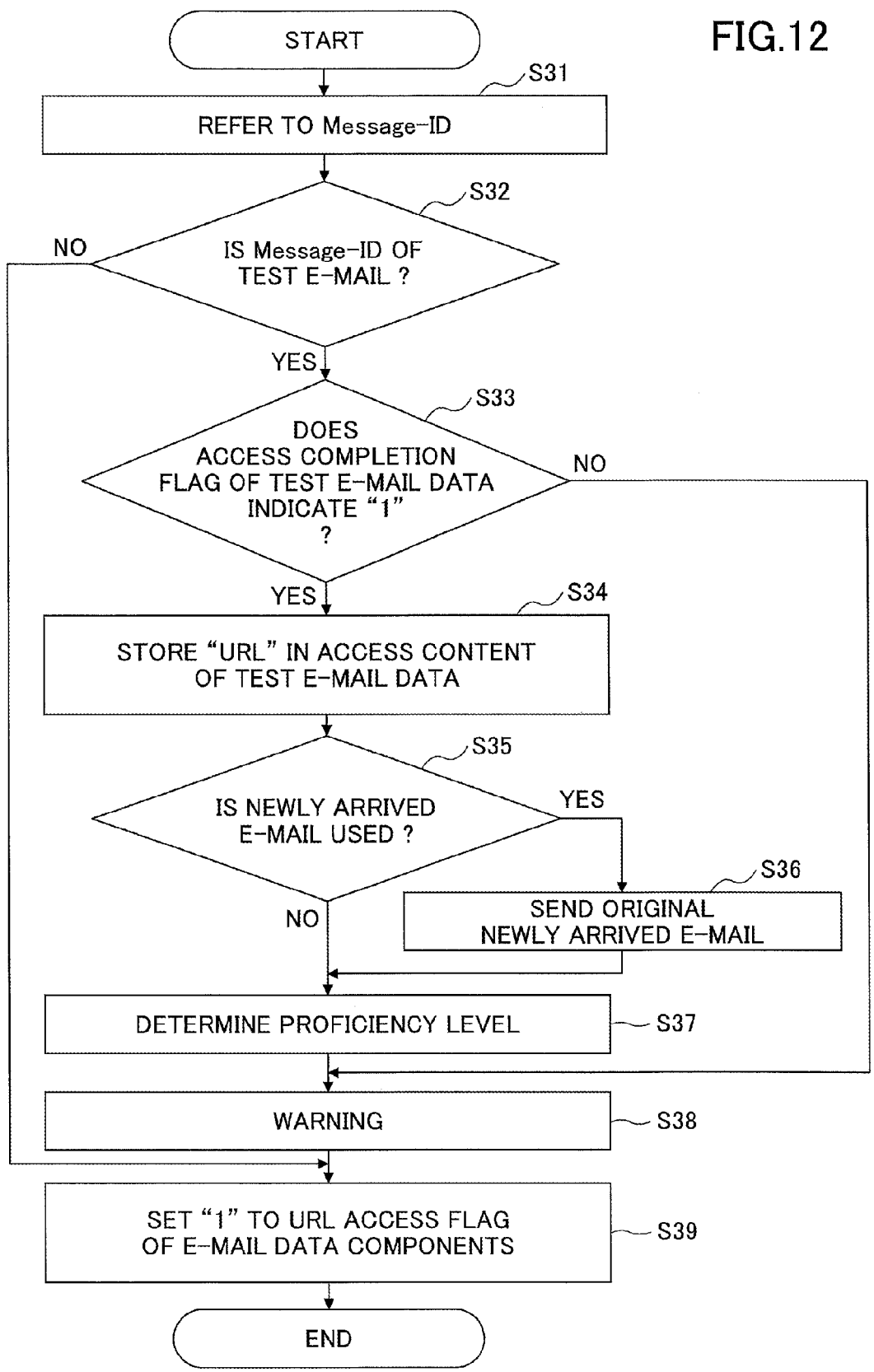
FIG. 12 is a flowchart for explaining an example of a URL access detection process.

FIG. 12 is a flowchart for explaining an example of a URL access detection process. In the example in FIG. 12, the URL access detection part 52 refers to the Message-ID of the e-mail in which the URL in the body text is accessed (step S31), and determines whether the referred Message-ID is the Message-ID of the test e-mail (step S32).

When the referred Message-ID is the Message-ID of the test e-mail (YES in step S32), the URL access detection part 52 determines whether the access completion flag of the test e-mail data 33 indicates "1" (step S33). It is to be noted that a case of "1" indicates that the URL is accessed. When the access completion flag of the test e-mail data 33 indicates "1" (YES in step S33), the URL access detection part 52 stores "URL" in the access details of the test e-mail data 33 (step S34).

Next, the URL access detection part 52 determines whether the newly arrived e-mail is used as the test e-mail (step S35). When the newly arrived e-mail is used (YES in step S35), the e-mail process execution part 40 (corresponding to the e-mail software) sends the original newly arrived e-mail (step S36).

When the newly arrived e-mail is not used (NO in step S35) or after a process in step S36, the proficiency level determination part 55 determines the proficiency level based on the proficiency level change rule 62 (step S37). Also, in a process in step S33, when the access completion flag of the test e-mail data 33 does not indicate "1" (NO in step S33) or after a process in step S37, the proficiency level determination part 55 conducts the warning corresponding to the proficiency level, for example (step S38). It is to be noted that in a process in step S38, the warning message corresponding to the proficiency level, which is determined beforehand, may be displayed at the screen, or sound may be output. However, the warning message is not limited to this manner.

Also, in a process in step S32, when the referred Message-ID is not the Message-ID of the test e-mail (NO in step S32) or after a process in step S38, a value "1" is stored to the URL access flag of the e-mail data components 23 (step S39).

<Example of Reply Operation Detection Process (Step S16)>

Figure 13:
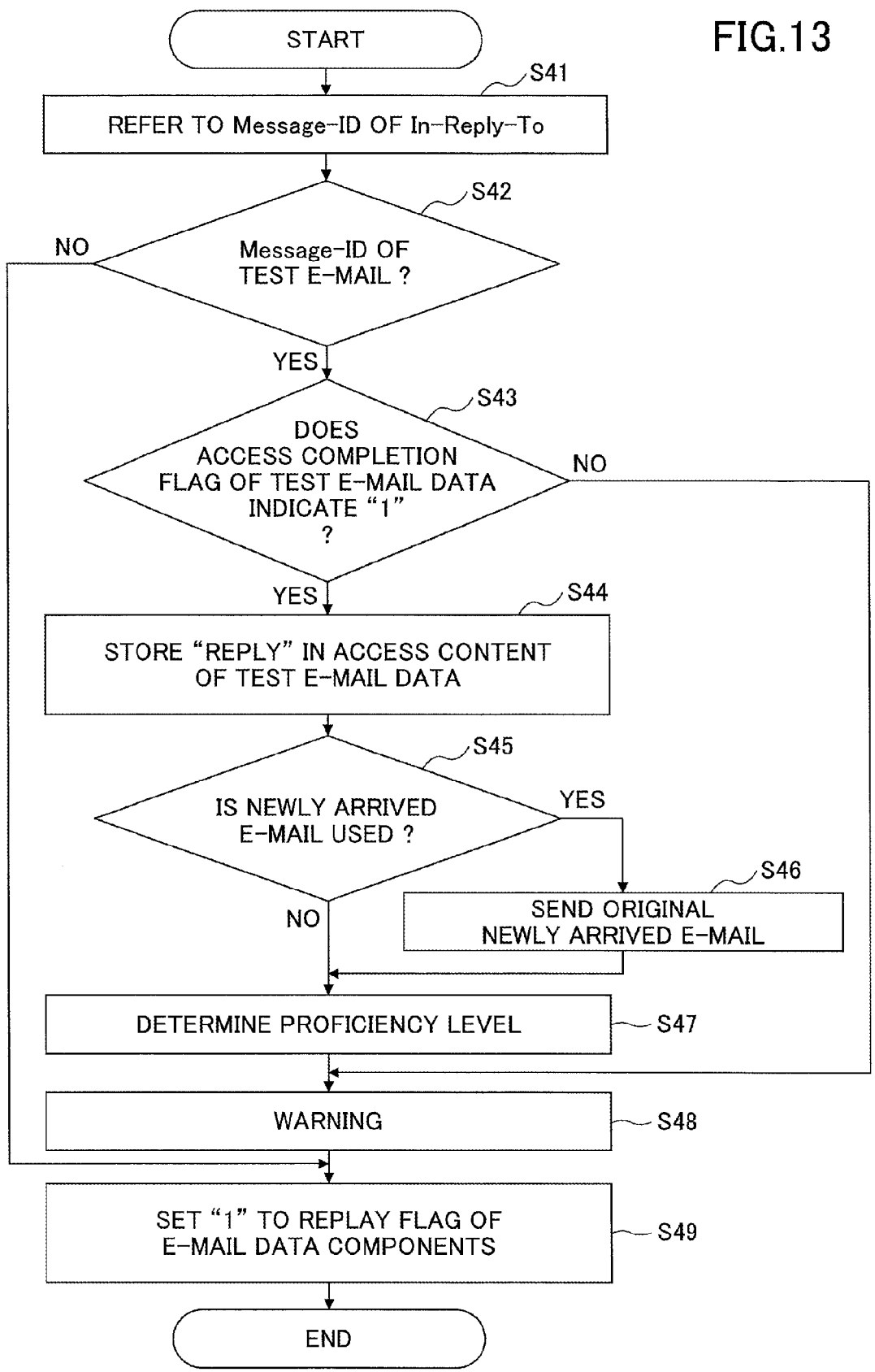
FIG. 13 is a flowchart for explaining an example of a reply operation detection process.

Next, an example of a reply operation detection process will be described with reference to the following flowchart. FIG. 13 is a flowchart for illustrating the example of the reply operation detection process. In the example in FIG. 13, the reply operation detection part 53 refers to the Message-ID of "In-Reply-To" of the reply e-mail (step S41), and determines whether the referred Message-ID is the Message-ID of the test e-mail (step S42).

When the referred Message-ID is the Message-ID of the test e-mail (YES in step S42), the reply operation detection part 53 determines whether the access completion flag of the test e-mail data 33 indicates "1" (step S43). It is to be noted that a case of "1" indicates that the test e-mail is replied. When the access completion flag of the test e-mail data 33 indicates "1" (YES in step S43), the reply operation detection part 53 stores "REPLY" in the access details of the test e-mail data 33 (step S44).

Next, the reply operation detection part 53 determines whether the newly arrived e-mail is used as the test e-mail (step S45). When the newly arrived e-mail is used as the test e-mail (YES in step S45), the reply operation detection part 53 sends the original newly arrived e-mail to the e-mail process execution part 40 (corresponding to the e-mail software) (step S46).

When the newly arrived e-mail is not used (NO in step S45) or after a process in step S46, the proficiency level determination part 55 determines the proficiency level based on the proficiency level change rule 62 or the like (step S47). In a process in step S43, when the access completion flag of the test e-mail data 33 does not indicate "1" (NO in step S43) or after a process in step S47, the proficiency level determination part 55 conducts the warning corresponding to the proficiency level, for example (step S48). It is to be noted that in a process in step S48, the warning message corresponding to the proficiency level, which is determined beforehand, may be displayed at the screen, or sound may be output. However, the warning message is not limited to this manner.

Also, in a process in step S42, when the referred Message-ID is not the Message-ID of the test e-mail (NO in step S42) or after a process in step S38, the proficiency level determination part 55 stores "1" to the reply flag of the e-mail data components 23 (step S49).

<Example of Inquiry Button Press Detection Process (Step S18)>

Figure 14:
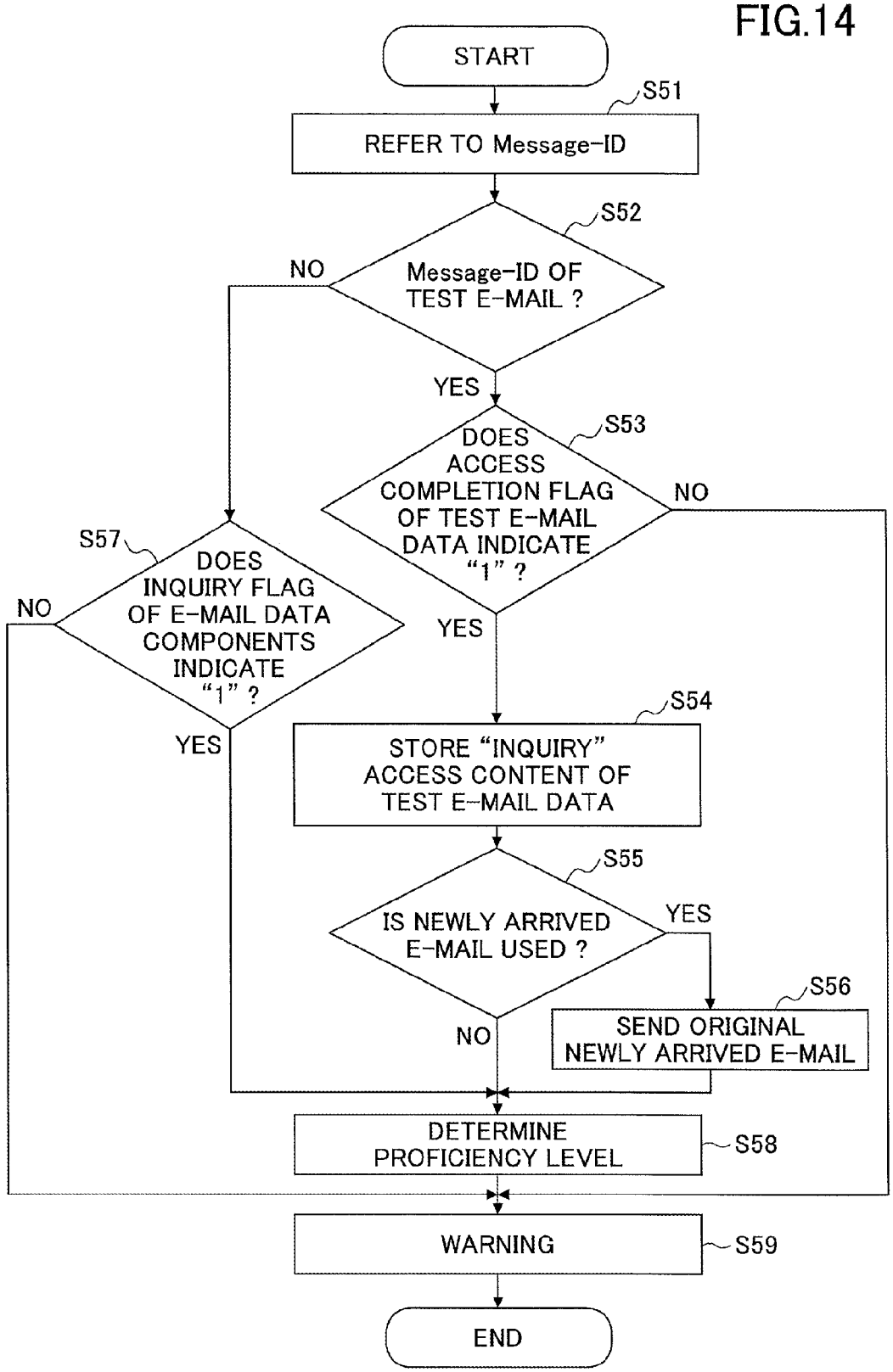
FIG. 14 is a flowchart for explaining an example of an inquiry button press detection process.

Next, an example of the inquiry button press detection process in step S18 in FIG. 10 will be described with reference to the following flowchart. FIG. 14 is a flowchart for explaining the example of the inquiry button press detection process. In the example in FIG. 14, the inquiry button press detection part 54 refers to the Message-ID of the e-mail when the inquiry button is pressed (step S51), and determines whether the referred Message-ID is the Message-ID of the test e-mail (step S52).

When the referred Message-ID is the Message-ID of the test e-mail (YES in step S52), the inquiry button press detection part 54 determines whether the access completion flag of the test e-mail data 33 indicates "1" (step S53). It is to be noted that a case of "1" indicates that the inquiry button is pressed. When the access completion flag of the test e-mail data 33 indicates "1" (YES in step S53), the inquiry button press detection part 54 stores "INQUIRY" to the access details of the test e-mail data 33 (step S54).

Next, the inquiry button press detection part 54 determines whether the newly arrived e-mail is used as the test e-mail (step S55). When the newly arrived e-mail is used as the test e-mail (YES in step S55), the inquiry button press detection part 54 sends the original newly arrived e-mail to the e-mail process execution part 40 (corresponding to the e-mail software) (step S56).

In a process in step S52, when the referred Message-ID is not the Message-ID of the test e-mail (NO in step S52), the proficiency level determination part 55 determines whether the inquiry flag of the e-mail data components 23 indicates "1" (step S57).

When the inquiry flag of the e-mail data components 23 indicates "1" (YES in step S57), the proficiency level determination part 55 determines the proficiency level based on the proficiency level change rule 62 or the like (step S58). It is to be noted that when the newly arrived e-mail is not used (NO in step S55) or after a process in step S56, the proficiency level determination part 55 determines the proficiency level.

Also, when the access flag of the test e-mail data 33 does not indicate "1" (NO in step S53), when the inquiry flag does not indicate "1" (NO in step S57), or after a process in step S58, the proficiency level determination part 55 conducts the warning corresponding to the proficiency level, for example (step S59). It is to be noted that in a process in step S59, the warning message corresponding to the proficiency level, which is determined beforehand, may be displayed at the screen, or sound may be output. However, the warning message is not limited to this manner.

<Example of Received E-mail Analysis Process (Step S04)>

Figure 15:
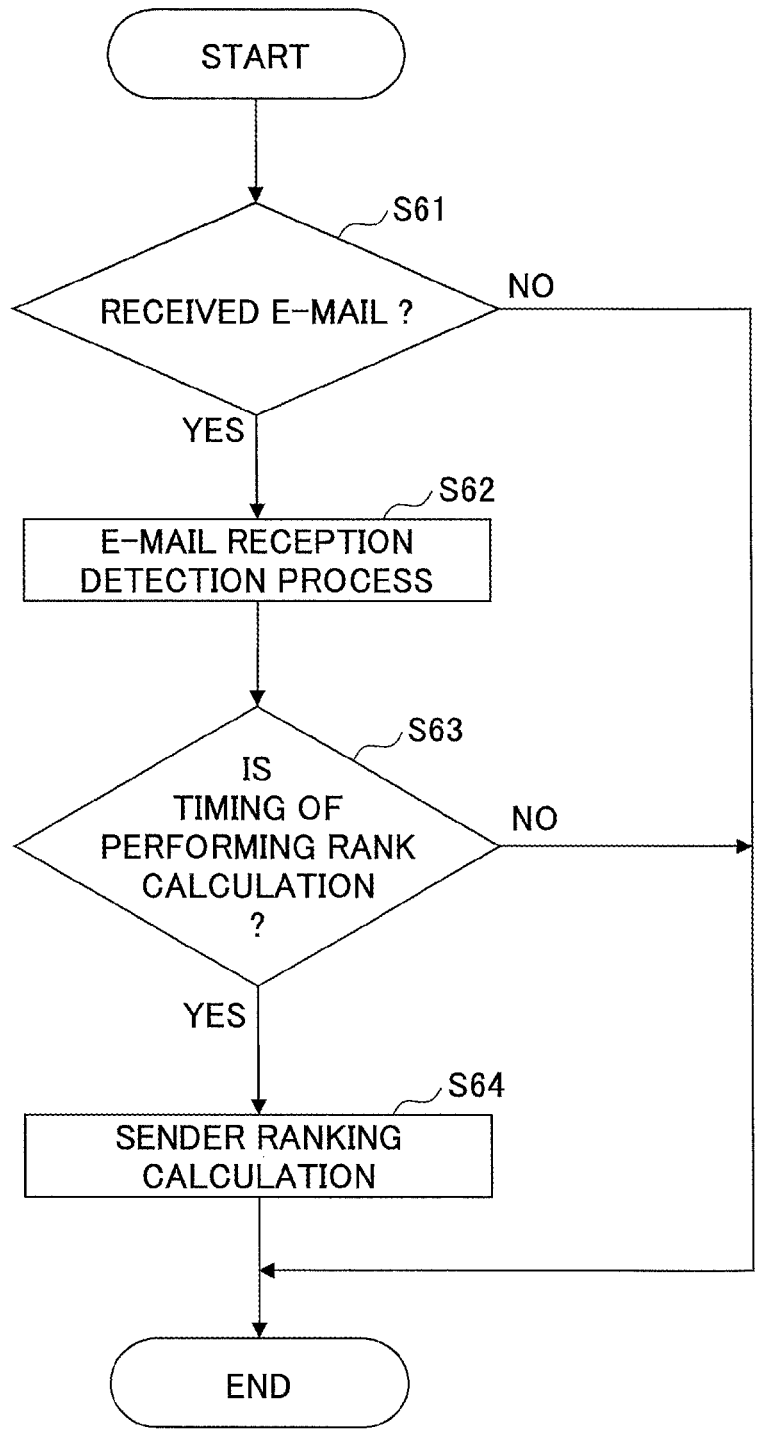
FIG. 15 is a flowchart of explaining an example of a received e-mail analysis process.

Next, an example of the received e-mail analysis process in step S04 in FIG. 10 will be described with reference to the following flowchart. FIG. 15 is a flowchart for explaining the example of the received e-mail analysis process.

In the example in FIG. 15, the received e-mail analysis part 20 determines whether the e-mail is received (step S61). When the e-mail is received (YES in step S61), the received e-mail analysis part 20 conducts an e-mail reception detection process (step S62).

Next, the received e-mail analysis part 20 determines whether it is a timing of performing a rank calculation (step S63). The timing of performing the rank calculation is determined based on the distribution period of the test e-mail, when a count of receiving the received e-mail, every time a certain term lapses, or the like. However, a timing determination is not limited to this manner. When it is the timing of the rank calculation (YES in step S63), the received e-mail analysis part 20 conducts a sender ranking calculation (step S64).

Also, when the e-mail is not received (NO in step S61) or when it is not the timing of the rank calculation (NO in step S63), the received e-mail analysis part 20 terminates the received e-mail analysis process.

<Example of E-mail Reception Detection Process (Step S62)>

Figure 16:
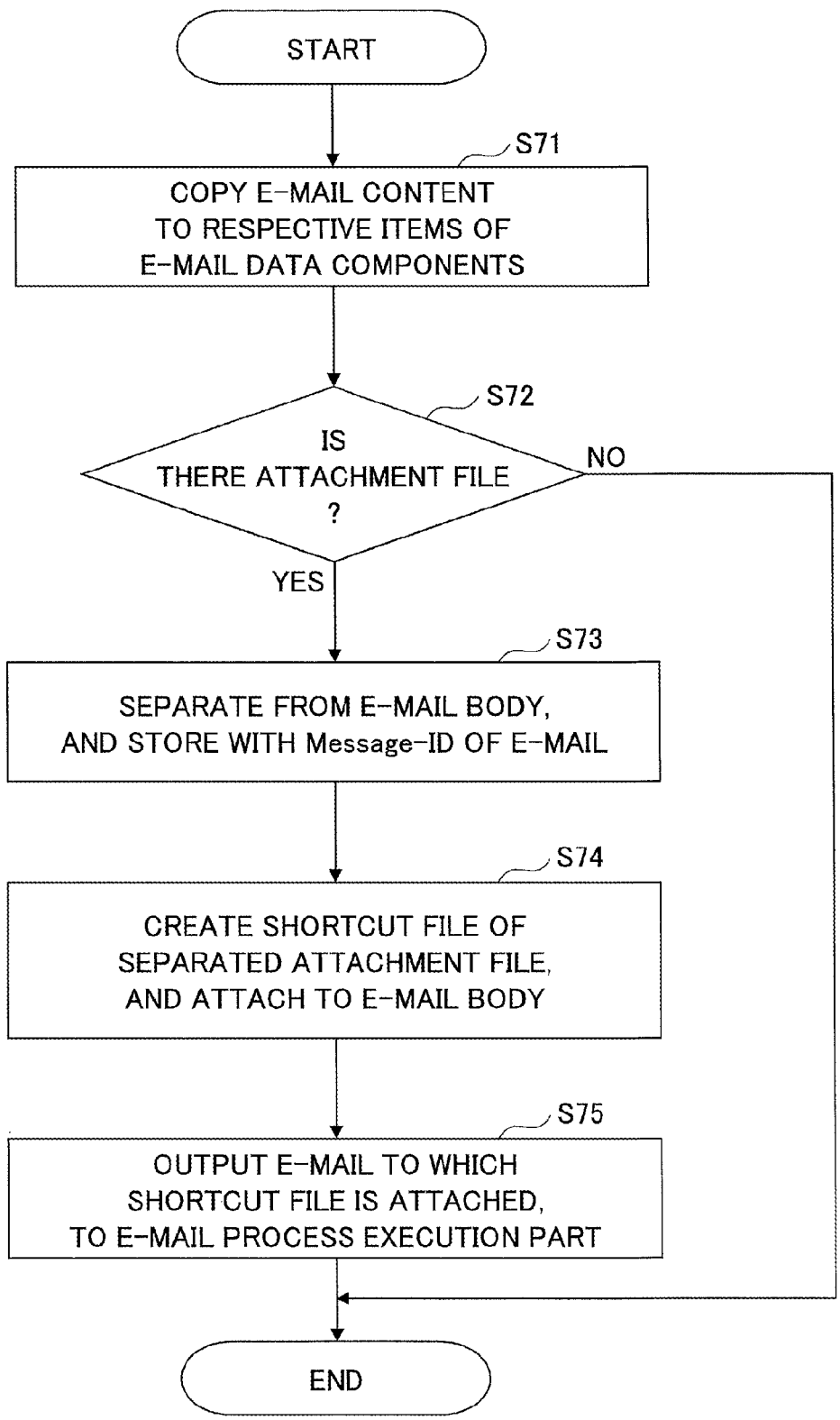
FIG. 16 is a flowchart of explaining an example of an e-mail reception detection process.

Next, an example of the e-mail reception detection process in step S62 in FIG. 15 will be described with reference to the following flowchart. FIG. 16 is a flowchart for explaining the example of the e-mail reception detection process. In the example in FIG. 16, the e-mail reception detection part 21 copies e-mail contents to respective items of the e-mail data components 23 (step S71). Next, the e-mail reception detection part 21 determines whether the attachment file is attached to the e-mail (step S72). It is to be noted that in a process in step S72, it may be determined whether a value is set in the item of "ATTACHMENT FILE" of the e-mail data components 23, so as to determine whether the attachment file is attached. However, a determination is not limited to this manner.

When the attachment file is attached (YES in step S72), the e-mail reception detection part 21 separates the attachment file from the body text of the e-mail and stores the attachment file with the Message-ID of the e-mail (step S73). Next, the e-mail reception detection part 21 creates a shortcut file of the separated attachment file, and attaches the shortcut file with the body text of the e-mail (step S74). Next, the e-mail reception detection part 21 outputs the e-mail with which the shortcut file is attached, to the e-mail process execution part 40 such as the e-mail software or the like (step S75).

Also, when the attachment file does not exist (NO in step S72), the e-mail reception detection part 21 terminates this e-mail reception detection process.

<Example of Sender Ranking Calculation (Step S64)>

Figure 17:
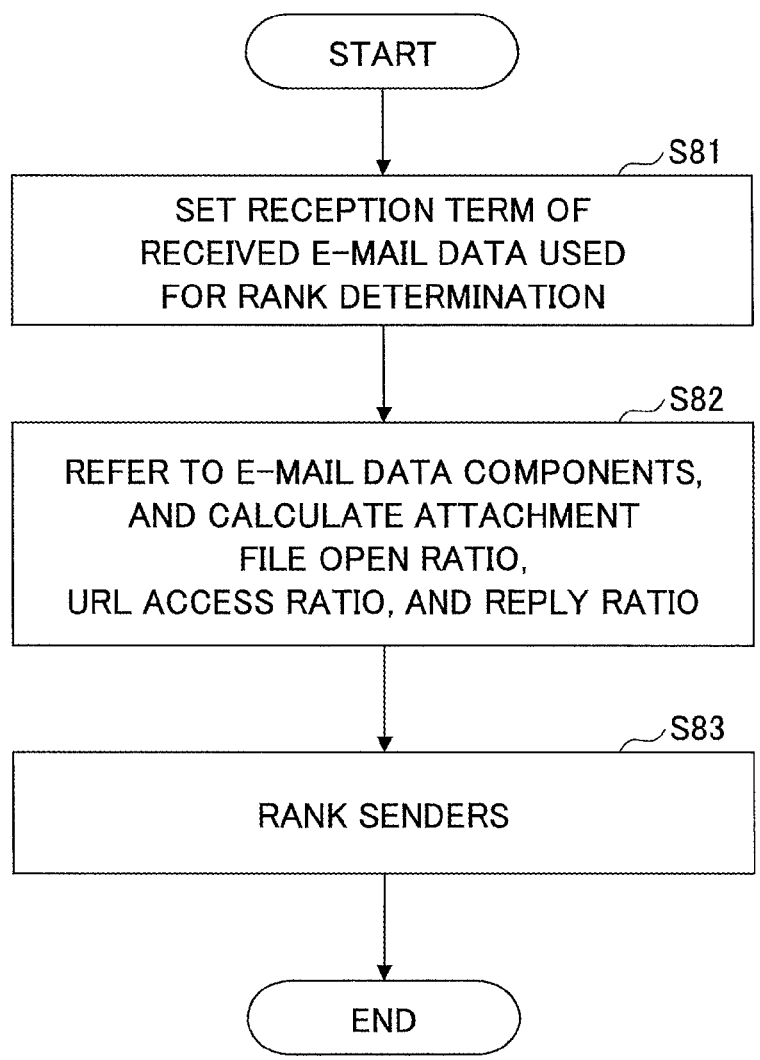
FIG. 17 is a flowchart of explaining an example of a sender rank calculation process.

Next, an example of the sender ranking calculation in step S64 in FIG. 15 will be described with reference to the following flowchart. FIG. 17 is a flowchart for explaining the example of the sender ranking calculation. In the example in FIG. 17, the sender rank calculation part 22 sets a reception term of the received e-mail data used for a ranking process (step S81). The reception term may correspond to a term such as the most recent week, the most recent month, or the like which is arbitrarily set. It is to be noted that this term may be set beforehand.

Next, the sender rank calculation part 22 refers to the e-mail data components 23 which is acquired by the e-mail reception detection part 21, and calculates the attachment file open ratio, the URL access ratio, and the reply ratio for each of senders of the received e-mails with respect to the term set in a process in step S81 (step S82).

Next, the sender rank calculation part 22 conducts the ranking process for each of the senders by using a certain calculation algorithm or the like (step S83). The certain calculation algorithm may indicate to multiply the reply ratio with the access ratio (reply ratio×access ratio). It is to be noted that in a process in step S83, instead of using the certain calculation algorithm, the sender rank calculation part 22 may conduct the ranking process for each of the senders by using at least one of the received e-mail count, the access ratio, and the reply ratio for each of the sender. It is to be noted that the sender rank calculation part 22 stores results acquired in processes in steps S82 and S83 in the sender ranking data 24.

<Example of Test E-mail Execution Process (Step S06)>

Figure 18:
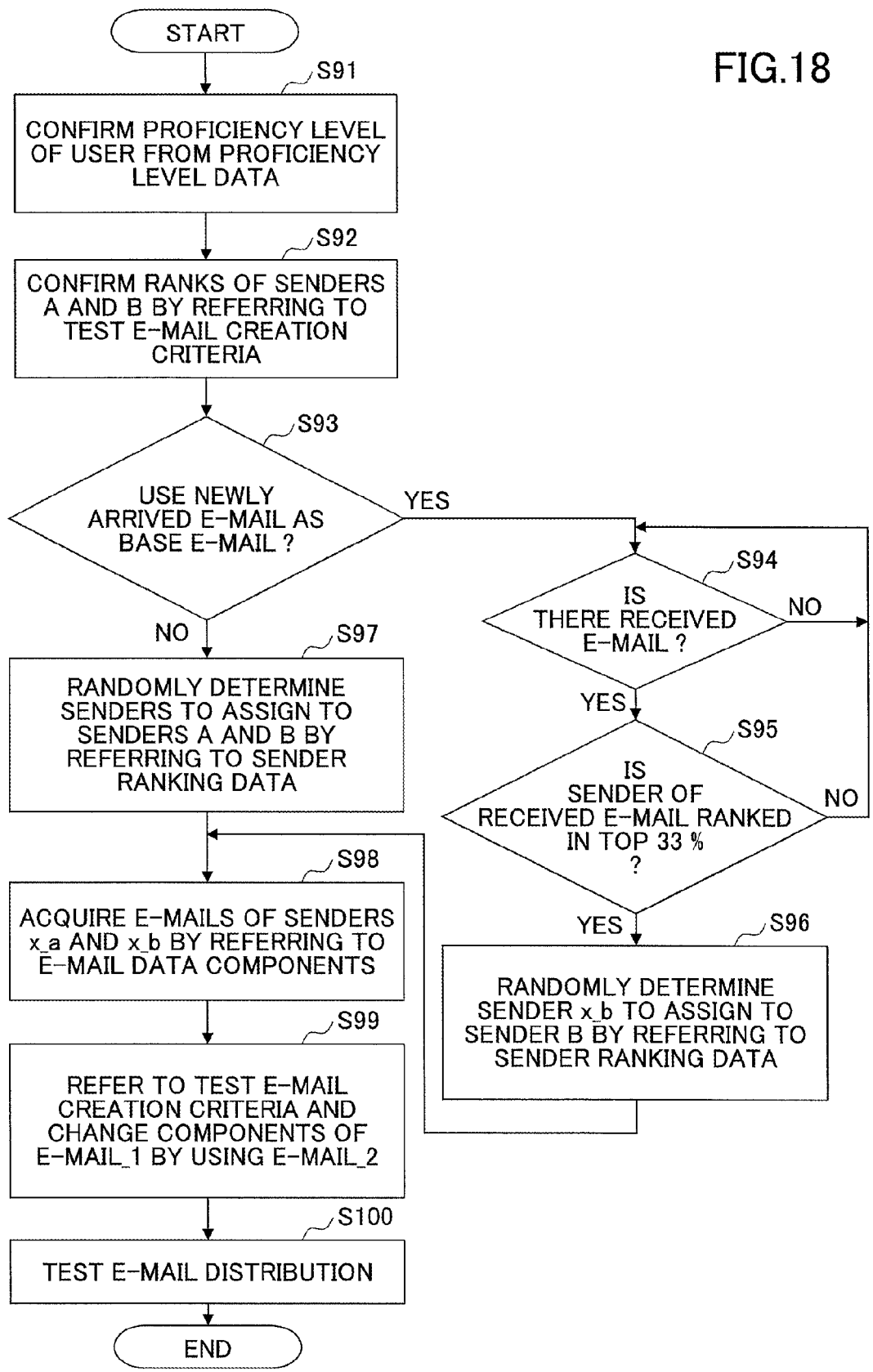
FIG. 18 is a flowchart of explaining an example of a test e-mail enforcement process.

Next, an example of the test e-mail enforcement process in step S06 in FIG. 9 will be described with reference to the following flowchart. FIG. 18 is a flowchart for explaining the example of the test e-mail enforcement process. It is to be noted that in the following, an example of creating the test e-mail by using two e-mails will be described. However, a test e-mail creation is not limited to this manner.

In the example in FIG. 18, the test e-mail creation part 31 confirms the proficiency level of the user based on the proficiency level data 63 (step S91), and confirms ranks of the senders A and B by referring to the test e-mail creation criteria 32 (step S92).

Next, the test e-mail creation part 31 determines whether the newly arrived e-mail is used as the base e-mail (step S93). When the newly arrived e-mail is used (YES in step S93), the test e-mail creation part 31 determines whether there is the received e-mail (step S94). When there is no received e-mail (NO in step S94), the test e-mail creation part 31 waits until the newly arrived e-mail is received. Also, when there is the received e-mail (YES in step S94), the test e-mail creation part 31 determines whether the sender of the received e-mail is ranked in the top 33% (step S95). It is to be noted that the above described numeral value is not limited to 33%.

When the sender of the received e-mail is not ranked in the top 33% (NO in step S95), the test e-mail creation part 31 goes back to a process in step S94. On the other hand, when the sender of the received e-mail is ranked in the top 33% (YES in step S95), the test e-mail creation part 31 randomly determines a sender x_b to assign to the sender B by referring to the sender ranking data 24 (step S96). In this case, a sender x_a is regarded as the sender of the newly arrived e-mail.

On the other hand, when the newly arrived e-mail is not used (NO in step S93), the test e-mail creation part 31 refers to the sender ranking data 24, and randomly determines senders to assign to the senders A and B (step S97). It is assumed that the senders x_a and x_b are determined to the senders A and B, respectively.

Next, the test e-mail creation part 31 acquires e-mails of the senders x_a and x_b by referring to the e-mail data components 23 (step S98). In the following, the acquired e-mails are referred as an e-mail_1 and an e-mail_2, respectively.

Next, the test e-mail creation part 31 changes components (the header information, the body text, and the like) of the e-mail_1 by referring to the test e-mail creation criteria 32 (step S99). It is to be noted that in a process in step S99, a part of components of the e-mail_1 may be replaced with a part of components of the e-mail_2, and a random letter may be added. However, a change method is not limited to this manner.

Next, the test e-mail distribution part 34 distributes the test e-mail to the user at the timing of the distribution date and time being set in the test e-mail data 33 and the like (step S100). Operation details and the like of the user with respect to the test e-mail distributed in a process in step S100 are detected in the above described processes in steps S01 and S02. In the embodiment, as described above, the e-mail creation process is repeated.

<Detailed Examples of Test E-mail>

Next, detailed examples of the test e-mail created in the embodiment will be described with reference to FIG. 19 through FIG. 23. FIG. 19 through FIG. 23 are diagrams illustrating detailed examples of the test e-mail created in the embodiment (part 1 through part 5).

In FIG. 19, an example of the main e-mail (the e-mail_1) to be the base e-mail is illustrated. In the embodiment, an e-mail, in which the sender has a higher rank and frequently exchanges, is set as the base e-mail. The e-mail_1 depicted in FIG. 19 is regarded as an e-mail in the same organization (having a domain name "abc.com"), and the sender and the destination indicate individual persons. The body text indicates contents pertinent to their business.

In the example in FIG. 20, an example of the sub e-mail (the e-mail_2) for a person having a lower proficiency level. In the embodiment, the e-mail from the sender having a lower rank than that of the e-mail_1 depicted in FIG. 19 is used. However, the e-mail to use is not limited to this example. In the example in FIG. 20, the body text indicates business related contents irrelevant to a work of an employee belonging to a research division.

FIG. 21 is a diagram illustrating an example of the test e-mail in which the e-mail_1 and the e-mail_2 are combined. In the example in FIG. 21, changes are conducted by replacing components (the header information and the body text) of the e-mail_1 depicted in FIG. 19, with components of the e-mail_2, and by adding a random letter and the like.

In the example in FIG. 21, the random letters 21a are added to an address of the sender in the header information, the destination indicates blank. Also, in the example in FIG. 21, an e-mail address, which is formed by a discernibly suspicious random letter string 21b, is added to a Carbon Copy (CC) in the header information. Moreover, a random letter string 21c is added to an attachment file name. Furthermore, in the example in FIG. 21, contents in the body text of the e-mail_1 are replaced with those of the e-mail_2. Furthermore, a literal error 21d is included in the contents and a random letters 21e are added in the URL, so that the some clues are provided to recognize the test e-mail.

As described above, the test e-mail creation part 31 creates the test e-mail suitable for a person having a low proficiency level based on contents of the test e-mail creation criteria 32.

FIG. 22 is a diagram illustrating an example the sub e-mail (an e-mail 3) for a person having a high proficiency level. In the example in FIG. 22, the body text of the e-mail 3 indicates business related contents, similar to the e-mail_1. Furthermore, the address information such as the attachment file, the URL, and the like are included in the body text.

FIG. 23 is a diagram illustrating an example of the test e-mail in which the e-mail_1 and the e-mail_2 are combined. In FIG. 23, the destination in the header information indicates "Cyber Countermeasure G". However, an individual's name "Mr. Igawa" is described at a beginning of the body text. This modification provides a clue for the user to detect the test e-mail due to inconsistency between the header information and a context in the body text. Since both the test e-mail depicted in FIG. 23 and the e-mail_1 include the business related contents, both the test e-mail and the e-mail_1 look like regular e-mail at first. However, if the user carefully looks at the test e-mail, the contents in the body text do not correspond to the title in the test e-mail. In the embodiment, the test e-mail is created depending on the proficiency level against the target-type e-mail for each of users.

In the embodiment, two e-mails (the main e-mail and the sub e-mail) are used to create the test e-mail. Alternatively, the test e-mail may be created by at least one e-mail, by a single e-mail, or by combining three or more e-mails.

<Various Types of Screen Examples>

Next, a screen example for viewing the received e-mail, and a screen example for revealing the test e-mail will be described with reference to FIG. 24 and FIG. 25. The screen example for revealing the test e-mail is displayed based on an operation result of the user with respect to the test e-mail and the like.

FIG. 24 is a diagram illustrating a screen example in the embodiment. A screen 80 depicted in FIG. 24 is used for the user to browse the received e-mail. The screen 80 includes an inquiry button 81 corresponding to the embodiment as well as regular operation buttons such as a reply button, a transfer button, a delete button, and the like. It is to be noted that a location, a type, and the like of the inquiry button 81 are not limited to those depicted in FIG. 24.

The inquiry button 81 may be realized as an add-in tool of the mail software (which may be Outlook (registered trademark), Thunderbird (registered trademark), or the like) which is used by the user. Also, the inquiry button 81 may be embedded as the e-mail process execution part 40. Moreover, the inquiry button 81 is arranged in the screen 80 of a viewer window of the e-mail.

It is to be noted that in the embodiment, a rule may be set so as to degrade the proficiency level when the user presses the inquiry button 81 with respect to the e-mail which is not the test e-mail. By this rule, it is possible to prevent an illegal test.

Figure 25:
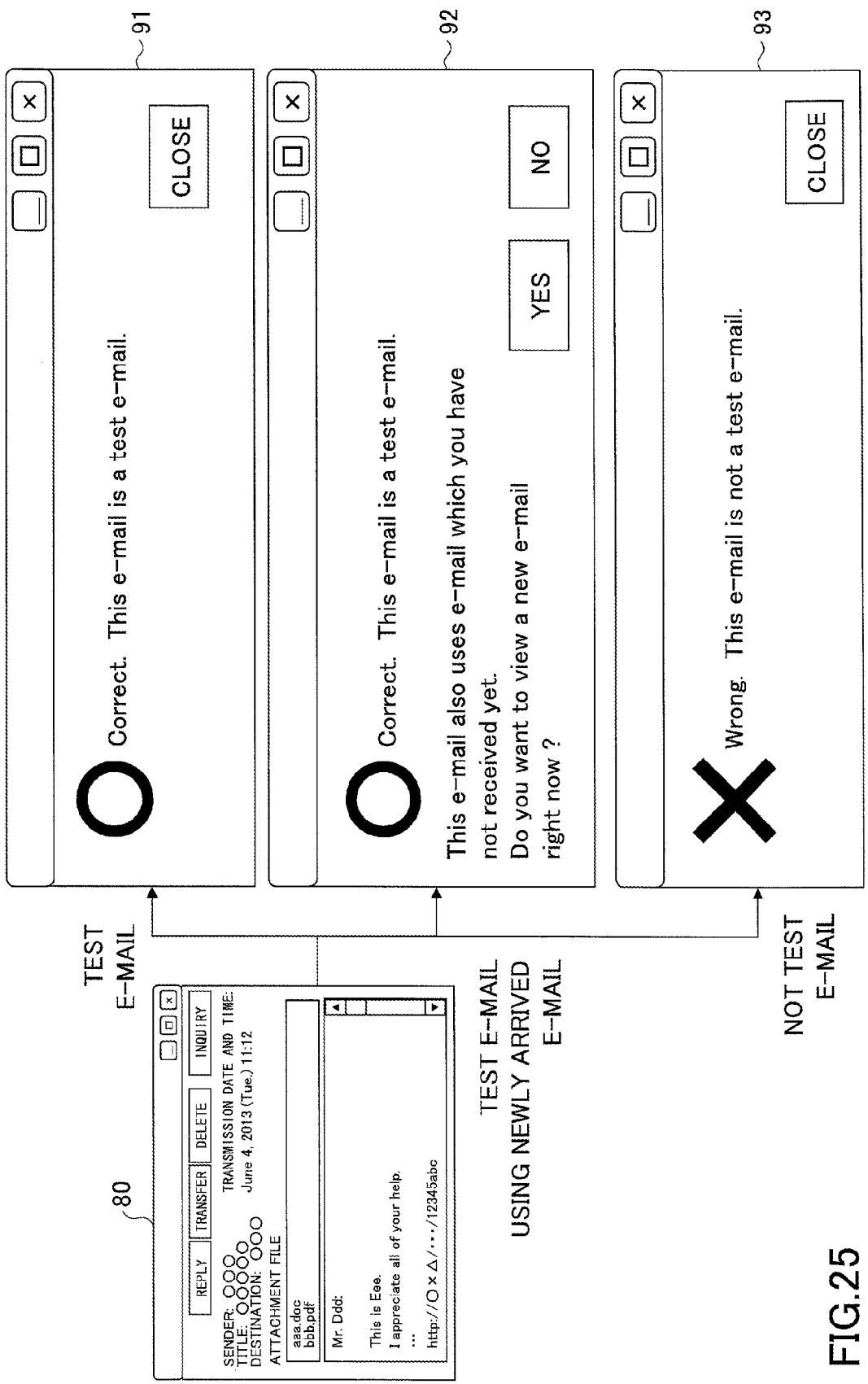
FIG. 25 is a diagram illustrating message screen examples when the inquiry button is pressed.

FIG. 25 is a diagram illustrating message screen examples when the inquiry button 81 is pressed. In the example in FIG. 25, a message screen 91 is displayed when the inquiry button 81 is pressed with respect to the test e-mail. When the message screen 91 is displayed, the proficiency level is increased by 1 (the proficiency level+1) based on the proficiency level change rule 62. Also, in a case of the test e-mail created by using the newly arrived e-mail, a message screen 92 as depicted in FIG. 25 is displayed. After inquiring whether a unreceived e-mail (a new e-mail) is viewed, the unreceived e-mail (the new e-mail) is distributed. In this case of displaying the screen 92, the proficiency level is increased by 1 (the proficiency level+1).

On the other hand, when the e-mail, in which the user pressed the inquiry button 81, is not the test e-mail, a message (warning) screen 93 is displayed as depicted in FIG. 25. Also, the proficiency level is decreased by 0.25 (the proficiency level−0.25).

Figure 26:
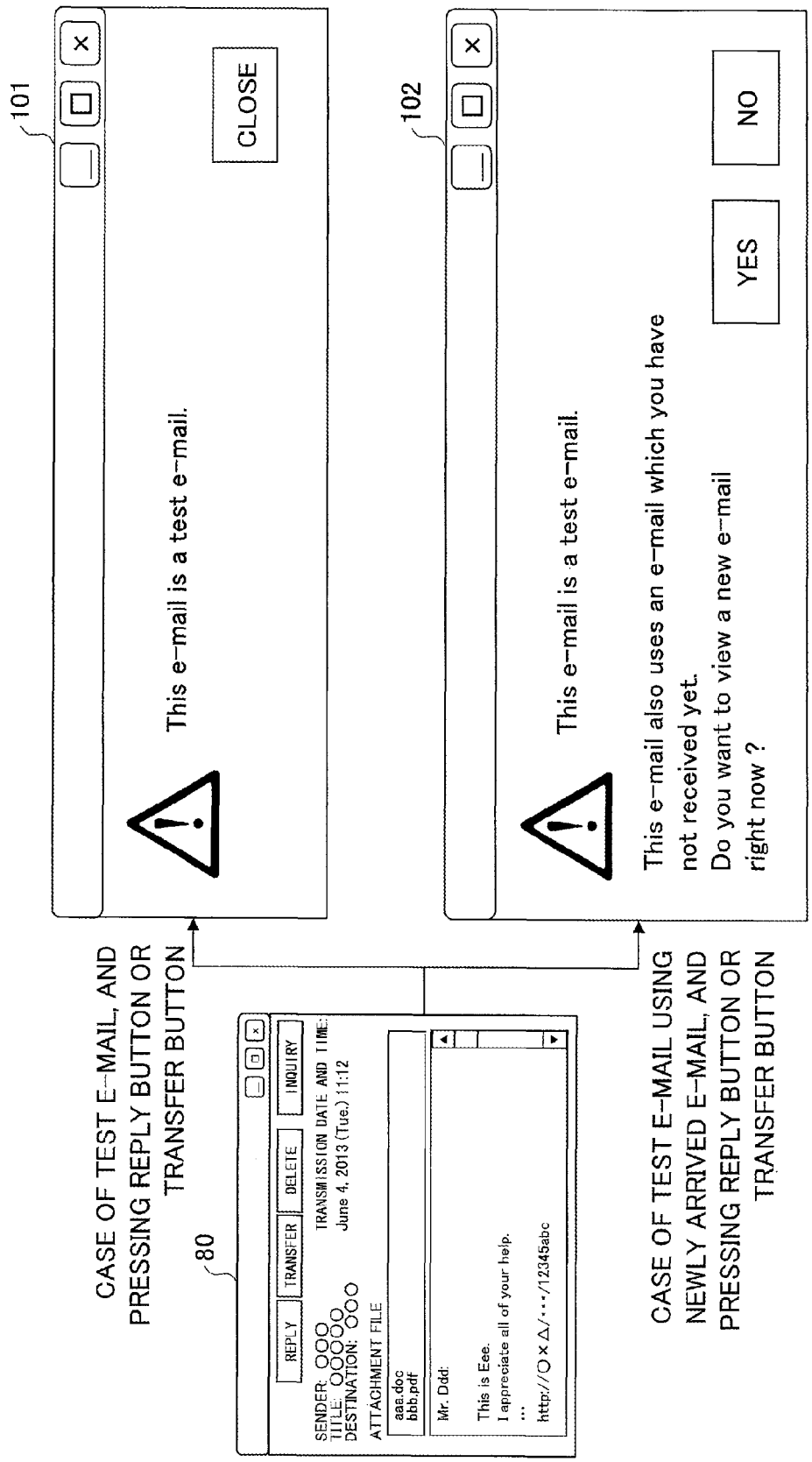
FIG. 26 is a diagram illustrating message screen examples when a reply button or a transfer button is pressed.

FIG. 26 is a diagram illustrating a screen example in a case of pressing the reply button or the transfer button. In the example in FIG. 26, in a case of the test e-mail and pressing the reply button or the transfer button, a message screen 101 is displayed as depicted in FIG. 26. In this case, the user has replied to the target-type e-mail. Hence, it is determined whether the user may receive the e-mail with which a new virus is attached. Accordingly, the proficiency level of the user is decreased by 0.5 (the proficiency level−0.5).

Also, in the example in FIG. 26, a message screen 102 is displayed in a case of the test e-mail created by using the newly arrived e-mail and pressing the reply button or the transfer button. The proficiency level is decreased by 0.5 (the proficiency level−0.5).

FIG. 27 is a diagram illustrating an screen example in a case of opening the attachment file or accessing the URL. In the example in FIG. 27, in a case of the test e-mail and opening the attachment file, a message screen 111 is displayed and the proficiency level is decreased by 1 (the proficiency level−1).

In a case of operations (of pressing the delete button or a creation button of a new e-mail, or the like) other than operations of pressing the reply button, the transfer button, of opening the attachment file, and of accessing the URL, the operations are irrelevant to the test e-mail. Thus, in the embodiment, the message screens 91, 92, and 93 for revealing the test e-mail as depicted in FIG. 25 may not be displayed, and the proficiency level may not be changed. Moreover, in the embodiment, when the user presses a new creation button, a message may be displayed to confirm whether this reply is related to the contents of the test email. When the user attempts to create a new e-mail with respect to the test e-mail by an answer of the user to the message, a process for decreasing the proficiency level may be performed.

According to the embodiment, it is possible to create the appropriate test e-mail for individual users. In the embodiment, it is possible for a user such as an employee to have an e-mail test against the target-type e-mail on a daily basis. Also, according to the embodiment, the test e-mail is created by being related to an individual business or the like. Hence, it is possible to perform a test in consideration of a behavior of the target-type e-mail. Moreover, according to the embodiment, it is possible to perform the e-mail test depending on the proficiency level of the employee.

As described above, in the embodiment, it is possible to create the test e-mail appropriate for each user.

Moreover, according to the embodiment, it is not required to prepare data for the test e-mail, and to open a business confidential of an individual user, but it is possible to individually test the users without notifying who gets fooled in the test e-mail. Also, it is possible to expect an educational effect for suppressing sending of an ambiguous e-mail which may be misunderstood as the target-type e-mail. It is to be noted that in the embodiment, the test e-mail corresponding to the target-type e-mail is created and the users are tested. However, a manner for test the users is not limited to this manner. Alternatively, the test e-mail may be individually created by corresponding to other uses.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a program which, when executed by a computer, causes the computer to perform an electronic mail creation process comprising:

creating a test electronic mail for a target-type electronic mail by referring to a storage part in which received electronic mails are stored;

using at least one electronic mail of the received electronic mails stored in the storage part, the at least one electronic mail selected based on a criteria being set beforehand; and changing at least one of header information and a body text of the at least one electronic mail;

displaying, in response to a request of browsing a received electronic mail, a browsing screen including a button to be pressed for a received electronic mail, which is determined as the test electronic mail;

increasing a proficiency level for the target-type electronic mail in response to pressing of the button in the browsing screen for the received electronic mail that is the test electronic mail;

determining the proficiency level of a user for the target-type electronic mail based on operation contents of the user with respect to the test electronic mail, the operation contents including at least one operation of opening a file attached to the created test electronic mail, accessing address information in a body text of the created test electronic mail, replying to the created test electronic mail, and inquiring by the user;

storing the determined proficiency level to the storage part;

performing the creating of the test electronic mail depending on the determined proficiency level stored in the storage part; and recreating the created test electronic mail for a case in which a certain time lapses after the created test electronic mail is distributed, and the user does not respond to the created test electronic mail.

2. The non-transitory computer-readable recording medium as claimed in claim 1, wherein the at least one electronic mail is selected based on ranks of senders, the ranks determined by using at least one of a received electronic mail count, an access count, and a reply ratio for each of the senders of the received electronic mails being stored in the storage part.

3. The non-transitory computer-readable recording medium as claimed in claim 1, wherein the electronic mail creation process further comprises:
displaying a message with respect to operation contents of the user who responded to the created test electronic mail on a screen.

4. An electronic mail creation method performed in a computer, the method comprising:
creating, by the computer, a test electronic mail for a target-type electronic mail by referring to a storage part in which received electronic mails are stored;
using at least one electronic mail of the received electronic mails stored in the storage part, the at least one electronic mail selected based on a criteria being set beforehand; and
changing at least one of header information and a body text of the at least one electronic mail;
displaying, by the computer, in response to a request of browsing a received electronic mail, a browsing screen including a button to be pressed for a received electronic mail, which is determined as the test electronic mail;
increasing, by the computer, a proficiency level for the target-type electronic mail in response to pressing of the button in the browsing screen for the received electronic mail that is the test electronic mail;
determining, by the computer, the proficiency level of a user for the target-type electronic mail based on operation contents of the user with respect to the test electronic mail, the operation contents including at least one operation of opening a file attached to the created test electronic mail, accessing address information in a body text of the created test electronic mail, replying to the created test electronic mail, and inquiring by the user;
storing, by the computer, the determined proficiency level to the storage part;
performing, by the computer, the creating of the test electronic mail depending on the determined proficiency level stored in the storage part; and
recreating, by the computer, the created test electronic mail for a case in which a certain time lapses after the created test electronic mail is distributed, and the user does not respond to the created test electronic mail.

5. An information processing apparatus comprising:
a memory configured to store received electronic mails; and
a processor coupled to the memory and the processor configured to create a test electronic mail for a target-type electronic mail by using at least one electronic mail of the received electronic mails stored in the memory, the at least one electronic mail selected based on a criteria being set beforehand; and
changing at least one of header information and a body text of the at least one electronic mail;
display, in response to a request of browsing a received electronic mail, a browsing screen including a button to be pressed for a received electronic mail, which is determined as the test electronic mail;
increase a proficiency level for the target-type electronic mail in response to pressing of the button in the browsing screen for the received electronic mail that is the test electronic mail;
determine the proficiency level of a user for the target-type electronic mail based on operation contents of the user with respect to the test electronic mail, the operation contents including at least one operation of opening a file attached to the created test electronic mail, accessing address information in a body text of the created test electronic mail, replying to the created test electronic mail, and inquiring by the user;
store the determined proficiency level to the storage part;
perform the creating of the test electronic mail depending on the determined proficiency level stored in the storage part; and
recreate the created test electronic mail for a case in which a certain time lapses after the created test electronic mail is distributed, and the user does not respond to the created test electronic mail.

* * * * *